(12) United States Patent
Ragner

(10) Patent No.: US 11,337,415 B1
(45) Date of Patent: May 24, 2022

(54) PORTABLE PEST ERADICATION SYSTEM

(71) Applicant: Gary Dean Ragner, Gainesville, FL (US)

(72) Inventor: Gary Dean Ragner, Gainesville, FL (US)

(*) Notice: Subject to any disclaimer, the term of this patent is extended or adjusted under 35 U.S.C. 154(b) by 261 days.

(21) Appl. No.: 16/524,050

(22) Filed: Jul. 27, 2019

Related U.S. Application Data

(60) Provisional application No. 62/715,791, filed on Aug. 7, 2018.

(51) Int. Cl.
*A01M 1/20* (2006.01)
*F24H 3/04* (2022.01)

(52) U.S. Cl.
CPC ......... *A01M 1/2094* (2013.01); *F24H 3/0417* (2013.01)

(58) Field of Classification Search
CPC ........................... A01M 1/2094; F24H 3/0417
USPC .............................................................. 43/144
See application file for complete search history.

(56) References Cited

U.S. PATENT DOCUMENTS

| | | | | |
|---|---|---|---|---|
| 1,798,290 A * | 3/1931 | Winner | ................. | F24H 3/0411 392/367 |
| 2,469,149 A * | 5/1949 | Blackwelder | ......... | F24H 3/0417 392/367 |
| 3,029,332 A * | 4/1962 | Cotts | ..................... | F24H 3/0405 392/350 |
| 3,725,640 A * | 4/1973 | Kunz | ..................... | F24H 3/0417 392/368 |
| 4,103,146 A * | 7/1978 | Rampe | ....................... | F24F 7/00 165/122 |
| 6,327,812 B1 * | 12/2001 | Hedman | ............. | A01M 1/2094 43/124 |
| 6,477,321 B2 | 11/2002 | Reiker | | |
| 7,926,222 B2 * | 4/2011 | Molnar | ............... | A01M 1/2094 43/132.1 |
| 9,247,725 B2 * | 2/2016 | Hosli | .................. | E05B 65/0014 |
| 10,145,583 B2 * | 12/2018 | Leow | ........................ | F04F 5/48 |
| 2007/0033825 A1 * | 2/2007 | Lo | .......................... | H05B 3/265 34/96 |
| 2009/0211148 A1 * | 8/2009 | McCarty | ............... | A01M 19/00 43/124 |
| 2011/0111687 A1 * | 5/2011 | Massimino | ............. | F24F 7/065 454/231 |
| 2012/0204478 A1 | 8/2012 | Gere et al. | | |

FOREIGN PATENT DOCUMENTS

EP    0815877 B1    10/2005

* cited by examiner

Primary Examiner — Brady W Frazier
Assistant Examiner — Jodutt Basrawi

(57) ABSTRACT

A portable pest eradication system 60, comprising a plurality of electrical cords 21a-e connected electrically to a plurality of the electric heating elements 65a-e, a circulation fan assembly 55, a programmable module 48 and a user interface for entering a treatment time and/or a target temperature for heating a particular room in a house or building. The portable pest eradication system 60 is designed to provide sufficient heat to reach the target temperature in a reasonable period of time to kill bedbugs, bedbug eggs, mold, ticks, bacteria, dust mites, scabies, cockroaches, body lice, fleas, and/or other pests.

17 Claims, 5 Drawing Sheets

PORTABLE PEST ERADICATION SYSTEM

CROSS-REFERENCE TO RELATED APPLICATIONS

This utility application claims priority from U.S. Provisional application Ser. No. 62/715,791, filed on Aug. 7, 2018, titled: "PORTABLE PEST ERADICATION SYSTEM" to the Applicant is hereby incorporated by reference in its entirety, including any figures, tables, equations or drawings.

BACKGROUND

Bedbugs, fleas, ticks, dust mites and other insect pests are incredibly difficult to control because they are capable of hiding in tiny cracks and crevices and, over time, have become increasingly resistant to common insecticides used for their control. Moreover, viable insecticides cannot be used on common household items like clothes, furniture, bedding, and mattresses.

Heat is an effective killer of bedbugs, mold, bacteria, ticks, dust mites, scabies, cockroaches, body lice, fleas and other insect pests, and is non-toxic, and can kill all life stages including bedbug eggs. The thermal death point (the combination of temperature and time at which a bedbug, mold, bacteria, tick, dust mites, scabies, cockroach, cockroaches, body lice, flea and other insect pest dies) for most insects and their eggs is dependent on temperature and the amount of time exposed to elevated temperatures. Bedbugs will die if exposed to 113° F. for 90 minutes or more, and they will die within 20 minutes if exposed to 118° F. Bedbug eggs must be exposed to 118° F. for 90 minutes to reach 100% mortality. Approximate example temperatures and times needed to kill other pests include:

mold 140° F. for 30 minutes
ticks 140° F. for 15 minutes
bacteria 131° F. for 15 minutes
dust mites 122° F. for 20 minutes
cockroaches 120° F. for 29 minutes
Scabies 120° F. for 10 minutes
bedbugs 118° F. for 20 minutes
Body lice 116° F. for 60 minutes
fleas 105° F. for 60 minutes The above temperatures and times can be considered examples of some of the many "thermal death points" for these pests. The thermal death point for a particular pest can be defined as a particular temperature applied for a particular time period that will result in a 100% death rate for that particular pest.

Heat is commonly applied to kill bedbugs in the form of steam, hot dryers, and portable heat chambers. Larger heat chambers can be used to treat furniture, while professional fuel-based heating systems can be used to treat entire rooms and structures. However, heat treatment of any kind is only temporary and bedbugs can re-infest the day after treatment. Thus, many pests can be continual problem involving cost, hardware and setup time. Still, heat treatment is one of the more effective tools in the fight against bedbugs, mold, bacteria, ticks, dust mites, scabies, cockroaches, body lice, fleas and other insect pests.

Since bedbugs, mold, bacteria, ticks, dust mites, scabies, cockroaches, body lice, fleas and other insect pests are difficult to access, and insecticides are not always available or function properly, homeowners and pest management professionals are continually searching for novel ways to kill bedbugs, mold, bacteria, ticks, dust mites, scabies, cockroaches, body lice, fleas and other insect pests inside a structure, particularly those near human sleeping areas.

SUMMARY

The presently disclosed pest eradication systems use high-temperature multiple-cord electrical heating systems that are used to generating high-temperatures in a single room to kill bedbugs, mold, bacteria, ticks, dust mites, scabies, cockroaches, body lice, fleas, and other pests in furniture, carpeting, walls, mattresses, bedding and/or other items within the room being treated. Because of the high energy density of electric heat system, the disclosed pest eradication systems can be compact and easily portable by a single person. Electrical power entering a home or building is generally capable of higher voltages and/or amperage than the typical wall outlet within that home or building. This higher voltage and/or amperage connection is split into separate circuits within the home or building providing about 1,500 to 2,000 watts at individual wall outlets in most industrialized countries (e.g., Europe commonly has 220 volts at ten to thirteen amps (2,200 to 2,860 watts, and in the United States has 120 volts at fifteen to twenty amps for 1,800 to 2,400 watts). In FIG. 1, an electrical power source 10 provides power to an electrical wall outlet 12 (hereafter "wall outlet 12") through a circuit breaker 11c. In most United States homes and buildings this circuit breaker 11c is typically a double pole circuit breaker that is mounted in a circuit breaker box somewhere in the building. This circuit breaker box usually contains dozens of separate circuit breakers that provide over-current protection to different portions of the building. In some countries, circuit breaker 11c might be at the wall outlet, and in other countries circuit breaker 11c could be built into the appliance being used (not safe). The circuit breaker 11c in American and most European homes and buildings limits how much current (amps) can flow from a particular wiring circuit and thus limits how much power can be drawn from a particular wall outlet in that circuit. This limits the amount of power that can be extracted safely from a single wall outlet to about 1,500 to 2,000 watts in the U.S.A. depending on if the circuit is designed for fifteen amps or twenty amps, respectively. In other countries similar or lower current limitations are used and many European countries use 220-volt systems at ten amps to provide approximately 2,000 watts of safely usable power (without danger of tripping the circuit breaker). In general, 1,500 to 2,000 watts is not enough power to heat even a very small room to a desired operating temperature of 120° F. to 150° F. Therefore, until this time, only propane, kerosene and other fuel-based heating system have been used to heat rooms and homes to high temperatures to kill pests. In Europe and other foreign countries 220-volt systems are often used, but these systems are often limited to ten to thirteen amps or less which is also insufficient to heat most rooms more than 40° F. above the ambient temperature of the home. Thus, prior art pest eradication systems to date mostly use propane and kerosene heating units to heat rooms to higher temperatures which is much more dangerous than using electrical heaters. For the inexperienced user, portable propane or kerosene heaters can be very dangerous in multiple ways: 1) fuel leaks can cause explosions or fires, 2) exhaust gases can deplete the house or building of oxygen which can be deadly, 3) propane tanks and hoses exposed to temperatures in excess of 150° F. could cause problems, 4) propane and kerosene heaters can get very hot and cause burns, especially for children, 5) both propane and kerosene can produce deadly carbon monoxide, 6) the open flame in these systems can ignite other flammable gasses in the house (e.g., natural gas) and these are just a few of the ways you can seriously injure or kill yourself with portable propane and kerosene heaters even when they are working properly. Because of these dangers, kerosene heaters have been banned in some parts of the United States. In contrast, the pest eradication systems disclosed here uses much safer electric heaters to create heat. Electric heaters and specifically ceramic type heaters are very safe and produce much lower temperatures than fuel-based heaters.

Each of the pest eradication systems disclosed herein use heat to kill bedbugs, mold, bacteria, ticks, dust mites, scabies, cockroaches, body lice, fleas, and other pests. The disclosed pest eradication systems can distribute their heat mostly through natural convection and conduction as seen in FIG. 1 or preferable through strong forced air flow as seen in FIGS. 2, 3 and 5A. In FIG. 1 where the disclosed heating unit can use one or more small airflow electric fans to remove the heat from the heating unit and create a directional airflow within the room that allows heated air to rise near the corners of the room and create a natural convection where cooler air sinks near the middle of the room, back to the pest eradication system where the air is reheated. Alternatively, the user can employ their own external fans (e.g., such as a house fan or a ceiling fan) to increase air circulation within the room which can increase the rate at which heat penetrates into cracks and crevices where pests might hide. In other embodiments high-volume forced air convention can be built into the heating unit as seen in FIGS. 2, 3 and 5A where a convection fan built into the pest eradication system is used to ensure good toroid-shaped air circulation within the room. In both types of systems an airflow is heated and expelled into the room. The advantage of a high-volume fan is that air can circulate around furniture and other items to eradicate bedbugs, mold, bacteria, ticks, dust mites, scabies, cockroaches, body lice, fleas, and other insect pests. The application of high-temperature air combined with a circulation fan creates a type of "convection oven" effect within the room being treated, which can quickly heat insects, mold, bacteria, and other pests to a lethal temperature. A predetermined air temperature can be maintained by various control means and automatically turn the pest eradication system off after a predetermined length of time and/or temperature is reached. In at least one the embodiment the pest eradication system can be run on a cycle that heats for eight hours and then shuts off. In another embodiment the pest eradication system can heat the room until the desired temperature is reached and then can maintain that temperature for a predetermined time (e.g., 3 hours, 4 hours, etc.) to ensure everything with the room is heated to the desired temperature even through blankets, dressers, clothing, carpeting and upholstery.

To kill mold an air temperature greater than one-hundred forty degrees Fahrenheit (140° F.) for at least thirty minutes can be used. To kill ticks an air temperature greater than one-hundred forty degrees Fahrenheit (140° F.) for at least fifteen minutes can be used. To kill bacteria an air temperature greater than one-hundred thirty-one degrees Fahrenheit (131° F.) for at least fifteen minutes can be used. To kill dust mites an air temperature greater than one-hundred twenty-two degrees Fahrenheit (122° F.) for at least fifteen minutes can be used. To kill scabies and cockroaches an air temperature greater than one-hundred twenty degrees Fahrenheit (120° F.) for at least thirty minutes can be used. To quickly kill bedbugs an air temperature of one-hundred twenty degrees Fahrenheit (120° F.) can be applied for just one minute. Air temperatures greater than one-hundred sixty degrees Fahrenheit (160° F.) can quickly kill nearly all insects (ticks, fleas, bedbugs, dust mites, etc.), mold and bacteria, but can also damage many household items such as plastic mini-blinds, batteries, vitamins, photo albums, particle board book shelves (cheap ones), cedar furniture, contact paper on shelves, gaskets on many items (shower heads, lamp light fixtures, wax ring on toilets, weather stripping, etc.) and many other items. To protect most household items, temperatures of the rooms should not exceed 150° F. and preferably no more than 145° F. Nearly all insects, bacteria and mold can be killed by 130° F. temperatures within a few hours. However, corners of rooms can be considerably cooler than the air temperature circulating in the middle of the room, allowing pest to escape death at lower temperatures. In general, it has been found that raising air temperatures in a room to 140° F. for several hours will kill nearly everything in that room, including pests hiding in the corners. Bedbugs and their eggs only require temperatures of 120° F. for a few hours to kill them. Exhaust air temperatures of 160° F. or more can be easily obtainable from a ceramic heating elements or other common air heating systems (e.g., a typical space heater or hair dryer).

Temperatures in excess of the desired thermal death point temperature are often needed to ensure insects and other pests hiding within cracks, crevices and carpeting are heated to a lethal temperature. Quickly circulating air helps with transferring heat to the pests, as does higher air temperatures. At lower temperatures the effective time durations needed to kill many pests may be too long for the user's patience. More rapid eradication of heat-tolerant pests (e.g., ticks and mold) can require temperatures of one-hundred forty degrees Fahrenheit (140° F.). As temperatures increase the amount of time needed to kill certain pests decreases. If longer application times are used, 125° F. can kill most ticks, fleas and bedbugs. A standard electrical space heater can provide heated air temperatures of 150° F. or more and can comprise a circulation fan. However, normal United States electrical outlets are typically 120 volts and generally limited to about 1,500 watts of power in many homes and limited to 1,200 watts in older homes. This is NOT sufficient power to heat a room any larger than a closet to temperatures above 110° F. (i.e., 35° F. above the building temperature). Also, the ability to use 220 volts circuits in most American homes is very limited and thus not useful in most people's homes. The disclosed multiple-cord electrical heaters can solve this problem by increasing power output of the electrical heater by increasing the number of separate power cords that can be plugged into multiple electric wall outlets that are on different household electrical circuits (i.e., on different circuit breakers). Thus, in the U.S.A. two, three, four, five or more power cords can plug into two, three, four, five or more separate wall outlets on different house circuit breaker circuits to allow 3,000 watts, 4,500 watts, 6,000 watts, 7,500 watts of power or more, respectively using 120 volt-15-amp circuits. This heating power can go into a single pest eradication system that is in a single room to heat that room to very high temperatures. In Europe two, three, four or more power cords can be used to provide 4,400 watts, 6,600 watts, 8,800 watts of power or more, respectively, using 220 volt-10 Amp circuits. In practice, most electrical systems are not rated to these maximum amp ratings, for example, in the United States electrical equipment running on 120 volts is limit to about 1,300 watts and while Europe limits power to about 1,800 watts or less. Thus, the actual power of a "real" system might be twenty percent less than the stated amperage Standard electrical extension cords can be used to reach distant wall outlets to use a different circuit breaker circuit. The power cords on the disclosed pest eradication systems can be just long enough to extend out of the room being heated (e.g., eight to ten feet is sufficient to reach the center of most rooms) and can be made with a higher temperature insulation to withstand the high temperatures that occur within the room being treated. Standard vinyl coated electrical cords were tested up to room temperatures of 152° F. and appeared to have no problem operating at this higher temperature even though the cord's wire gauge was undersized for the amps being run through it. In some embodiments the electrical cords on the disclosed heating units can be high-temperature cords that can safely operate in a 130° F., 140° F., 150° F., 160° F. or higher temperature environment while conducting the needed electrical power.

Many examples of pest eradication systems are presented in the present Application for providing the desired high temperature to a single room and heating its contents (e.g., chairs, mattresses box springs, electrical appliance, blankets, clothing, covers, recliners, sofas, etc.) to a temperature that can be lethal to bedbugs and also mold, ticks, bacteria, dust mites, scabies, cockroaches, body lice, fleas, and/or other pests.

In FIG. 1, a first example pest eradication system 20 is disclosed with three electrical heating elements built into a space heater with multiple electrical power cords for increasing the temperature of a room to the desired operating temperature for the desired length of time. In this example embodiment, the pest eradication system 20 can use the electrical output from three separate circuits within a home or building to provide three times the power output as a standard space heater. In other embodiments two or more separate circuits can be utilized to provide the desired power. Five or six separate power circuits can be utilized in some embodiments to heat even very large rooms. In some embodiments, for use in larger homes, seven or more separate electrical circuits (seven or more electrical cords) may be available for use and provide power outputs over 10,000 watts. One modern home tested had 3,000 square feet of living space and provided six-20-amp wall outlet circuits and four-15-amp wall outlet circuits. Smaller houses will generally have less wall outlet circuits. The pest eradication systems disclosed here can all have a timer that automatically turns the pest eradication system off after a predetermined time period. In other embodiments, the pest eradication systems can have a temperature sensor to maintain the treated room temperature during use to prevent over-heating.

In FIG. 2, a second example pest eradication system 20A is disclosed comprising the cord pest eradication system 20 and a high-volume air circulation fan assembly. This circulation fan assembly can disperse heat quickly away from the pest eradication system 20 and form a toroid-shaped airflow within the room that ensure an even heating of the room (i.e., no hot-spots). As an option, the circulation fan assembly be designed to circulate heated air in the downward direction, or the upward direction or even to one or more sides.

In FIG. 3, a third example pest eradication system 50 is disclosed, where the heating elements can be a standard high-temperature resistor wire enclosed in a housing deigned to capture the airflow from the air circulation fan assembly. This pest eradication system 50 can reach a peak air temperature over 150° F. after about five hours and with an additional three hours of maintaining than 150° F. temperature can produce temperatures between a typical mattress and box spring of around 140° F. The forced convection created by the circulation fan assembly produces a toroid shaped airflow within a room that can drive heat into cracks and crevices near walls and within furnishings. The thermal death point for some pest can be reached even under blankets and comforters during an eight hour or longer heating cycle for eradicating bacteria, bedbugs, dust mites, scabies, cockroaches, body lice, fleas, and other pests.

In FIG. 5A, a fourth example pest eradication system 60 is disclosed, that is very similar to the example pest eradication system 50 seen in FIG. 3, but now comprises five power cords and five heating elements to provide greater power output and its centrifugal fan assembly which is centrally positioned within the five electrical heating elements. The centrifugal fan assembly blows air radially outward through the heating elements to cool them. The pest eradication system 60 can provide a compact heating system that can efficiently circulate air through both the pest eradication system 60 and around the room in a toroidal circulation pattern. The circulating air can drive heat into cracks and crevices near walls and within furnishings. Heat can penetrate blankets and comforters and kill bedbugs, mold, ticks, bacteria, dust mites, scabies, cockroaches, body lice, fleas, and other pests using an eight hour or longer heating cycle for eradicating.

In FIG. 5B, a ceramic heating element 70 is disclosed, that can be substituted for the resistor wire style heating elements seen in the pest eradication systems 50 and 60 (see FIG. 3 and FIG. 5A respectively). A centrifugal fan assembly can operate inside the ceramic heating elements 70 and in some embodiments, the heating element support structure (not shown) can be modified when substituting the ceramic heating element 70 for resistor wire style heating elements seen in the pest eradication systems 50 and 60. The use of lower temperature support materials, such as plastics, can be facilitated by the much lower operating temperature of the ceramic heating element 70 as compared to resistor-wire style heating elements.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

| DRAWING REFERENCE NUMBERS | | | |
|---|---|---|---|
| 10 | Electrical power source (e.g., Utilities) | 11a-d | Circuit breakers |
| 12 | Electrical wall outlet | | |
| 20 | Example 1 - Portable Pest Eradication System with compact size | 20A | Example 2 - Portable Pest Eradication System with large Circulation fan |
| 21a-21e | Electrical power cords | 22 | Housing of heater 20 |
| 24a-24c | Heating units (e.g., ceramic heaters) | 23 | On/Off switch |
| 25 | Display panel | 25a | Control dial |
| 25b | Selection button | 25c | Wireless transmitter/receiver |
| 26 | Support legs | 27 & 27a | Temperature Sensor & Sensor wire |
| 28 | Power lights on space heater 20 | 29 | Electrical plug with power light |
| 29a | Optional power light in electrical plug | | |
| 30 | Air Circulation fan Assembly | 33 | Fan motor |
| 34 | Motor drive shaft | 36 | Fan guard |
| 38 | Axial fan blade | 39 | Airflow path (toroid-shaped) |
| 40 | Multiple plug heater | 41 | Vent holes |
| 42 | Lower housing | 43 | Mode control selector (fan speed and Kill mode) |
| 43a-d | Electrical switches | 44a | Shaped heat shield |
| 44b | Secondary heat shield | 45a-d | Heating elements |
| 46 | Safety screen | 47 | Upper housing |
| 48 | Programable Module | 50 | Example 3 - Pest Eradication System with internal circulation fan |
| 52 | Potentiometer (analog input device) | 53a-d | Fan motor |
| 55 | Centrifugal fan assembly | 56a-d | Relay switches (solid state relay - SSR) |
| 58 | Fan wheel (fan blades and hub) | 59 | Toroidal air circulation pattern |
| 60 | Example 4 - Pest Eradication System with centrifugal fan | 61 | Oversized air holes |
| 62 | Lower housing | 64a-b | Thermal barriers (e.g., sheet metal) |
| 65a-e | Heating elements | 66 | Safety screen |
| 67 | Upper housing cover (in shadow lines) | 67a | Air intake opening |
| 69 | Toroidal airflow (toroid-shaped path) | | |
| 70 | Ceramic style heating element (ring-shaped) | 72a-b | Electrical contacts |
| 74a-b | Corrugated metal rings (i.e., conductive) | 75 | Multiple ceramic patches |

DETAILED DESCRIPTION

The present disclosure is related to pest control, and more particularly, to an automatic insect, bacteria and fungus eradication system that uses thermal exposure over predetermined time periods to eliminate most notably insects, bacteria and mold within the room being treated.

Figure 1:
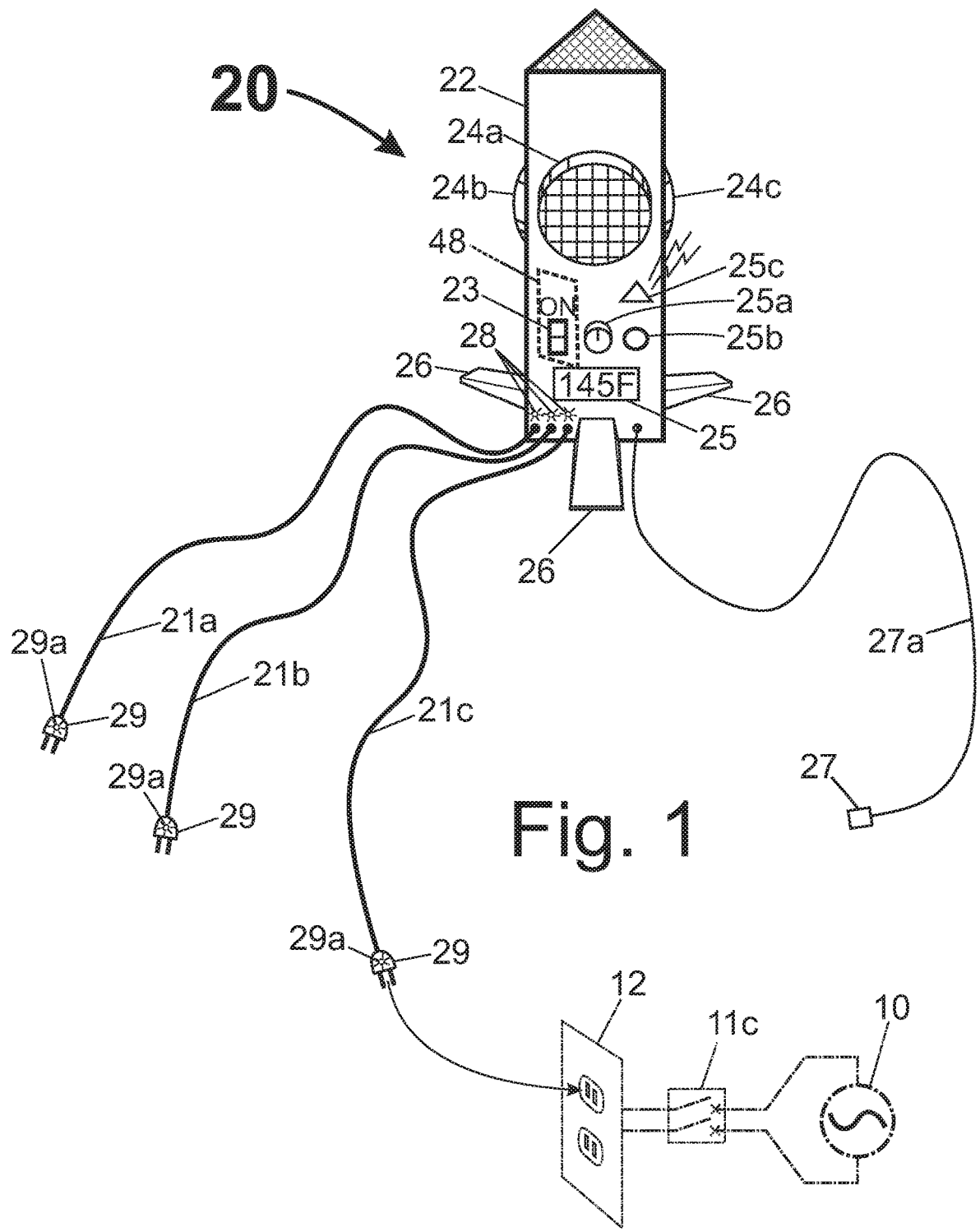
FIG. 1 is a schematic illustration of the example pest eradication system 20.

FIG. 1 is a schematic illustration of the example pest eradication system 20, according to one or more embodiments of the present disclosure. The pest eradication system 20 can be made very compact by using a single fan so that a user can easily transport it by themselves. Further, the pest eradication systems disclosed herein do not need to be broken down or disassembled to transport. As illustrated, the pest eradication system 20 (hereafter "eradication system 20") can comprise three electrical cords 21a, 21b and 21c each with an electrical plug 29, a housing 22, a power switch 23, three heating units 24a, 24b and 24c, a display panel 25, a control dial 25a, a selection button 25b, a wireless transmitter/receiver 25c, three support legs 26, an external temperature sensor 27 at the end of sensor wire 27a, three optional power lights 28 and a programmable module 48. The optional power lights 28 can display if electrical cords 21a-c are receiving electrical power from the electrical power source 10 through the electrical cords 21a-c and/or if the heating units 24a-c are receiving power, respectively. Each electrical cord 21a-c must be plugged into a different electrical wall outlet similar to the wall outlet 12, but each connected electrically to a different circuit breaker (e.g., circuit breaker 11a-c, see FIG. 4) so that each electrical cord 21a-c can draw a maximum amount of power from its respective electrical wall outlet without tripping its particular circuit breaker. The eradication system 20 may be sized and otherwise configured to heat a variety of different sized rooms. The eradication system 20 may be sized and otherwise configured to produce significant air circulation within the room to effectively heat corners and edges of the room. The eradication system 20 may be used in combination with household circulation fan (not shown) to create higher speed air flow within the room being treated. The eradication system 20, as well as other pest eradication systems disclosed herein, may be used within rooms containing various types of furniture or furnishing susceptible to the infestation and maintenance of bedbugs, mold, ticks, bacteria, dust mites, scabies, cockroaches, body lice fleas, and/or other pests. In the illustrated embodiments, for example, the room being treated might contain a bed, dresser, nightstand, etc., and more particularly, a mattress or bed assembly which may comprise a headboard and a footboard (not shown) which are common for bedroom furniture. The room being treated may also contain a closet and multiple articles of clothing, a dresser, an upholstered furniture, and other furnishings such as, but not limited to, a sofa, a loveseat, a futon, a recliner, chair, or any combination thereof that can safely be heated above a predetermined operational temperature. Accordingly, while FIG. 1 depicts only the eradication system 20, the room in which it is placed can contains multiple items to be cleaned of pests during a single room treatment. The disclosure of specific items within the treated room is merely for illustrative purposes and should not be considered limiting to the scope of treatable items for the present disclosure.

In FIG. 1, the housing 22 can provide support for the heating units 24a-c, the display panel 25 (hereafter "display 25"), control dial 25a, selection button 25b and wireless transmitter/receiver 25c. The electrical cords 21a-c can be attached electrically to the heating units 24a-c, respectively through one or more control circuits to provide electrical power to the heating units 24a-c respectively. The heating units 24a-c can comprise various types of electrical air heating systems, including but not limited to, a wire coil heating element and a ceramic heating element. The power switch 23 can turn-on and turn-off power to all three heating units 24a-c at the same time by using three electrical switches combined into the single power switch 23. Selection button 25b can provide selection input to program the programmable module 48 (also see FIGS. 2, 3, 4 and 5) to control operational temperature and time settings using display 25 and control dial 25a. In alternate embodiments, other existing prior art hardware can be substituted for display 25, control dial 25a and selection button 25b to provide a user interface for entering operating temperature and cycle time, such as, a programmable module in communication with a wireless transmitter/receiver. Of course, many alternate systems exist for inputting, setting, and controlling the desired operating temperature and operational time. The set of three support legs 26 help keep the housing 22 upright and represents only one example of a support stand for the disclosed pest eradication systems. In other embodiments, a pedestal or a box stand might be used to support the housing 22. In this embodiment of the disclosed eradication system 20 and those examples to follow can use standard UL approved safety components for electrical heaters as well as other prior art safety systems for space heaters and other high temperature equipment, which can be included, but is not limited to, a tip-over shut-off switch, one or more internal temperature sensors to detect overheating of the pest eradication system and other space heater safety equipment (e.g., fuses, circuit breakers, etc.).

The pest eradication system 20 may comprise dimensions that are small compared to the room being treated. In the illustrated embodiment, the electrical cords 21a-c may generally take the form of a standard electrical cords that are rated for the heating unit (space heater) output to which it is electrically connected. The eradication system 20 can comprise one or more internal fans to pull in air and expel it through the heating units 24a-c. even with the small size of the housing 22 shown in FIG. 1, a significant volume of air can flow out through the heating units 24a-c to maintain safe output air temperatures coming from these heating units.

In some embodiments, the heating units 24a-c may be in electrical communication with electrical cords 21a-c respectively. In the illustrated embodiment, each electrical cord 21a-c has its own electrical plug 29 with an optional power light 29a. The optional power light 29a can be used to inform the user if electrical power is still going to that particular electrical cord (circuit breaker has not tripped). Electrical cords 21a-c can provide maximum power to eradication system 20 by plugging each of the electrical plugs 29 into a separate standard electrical wall outlets (similar to wall outlet 12), each of which are on different electrical circuits (on different circuit-breaker circuits) within the home or building. In this way, each electrical cord 21a-c can draw its full current and power from its associated wall outlet and its associated circuit breaker. These electrical wall outlets (power outlets) can be in rooms distant from the room being treated by using standard electrical extension cords to bring the electrical power from the electrical wall outlet 12 to the eradication system 20. The electrical cords 21a-c can be plugged into these standard electrical extension cords to provide electrical power to the heating units 24a-c respectively.

Figure 2:
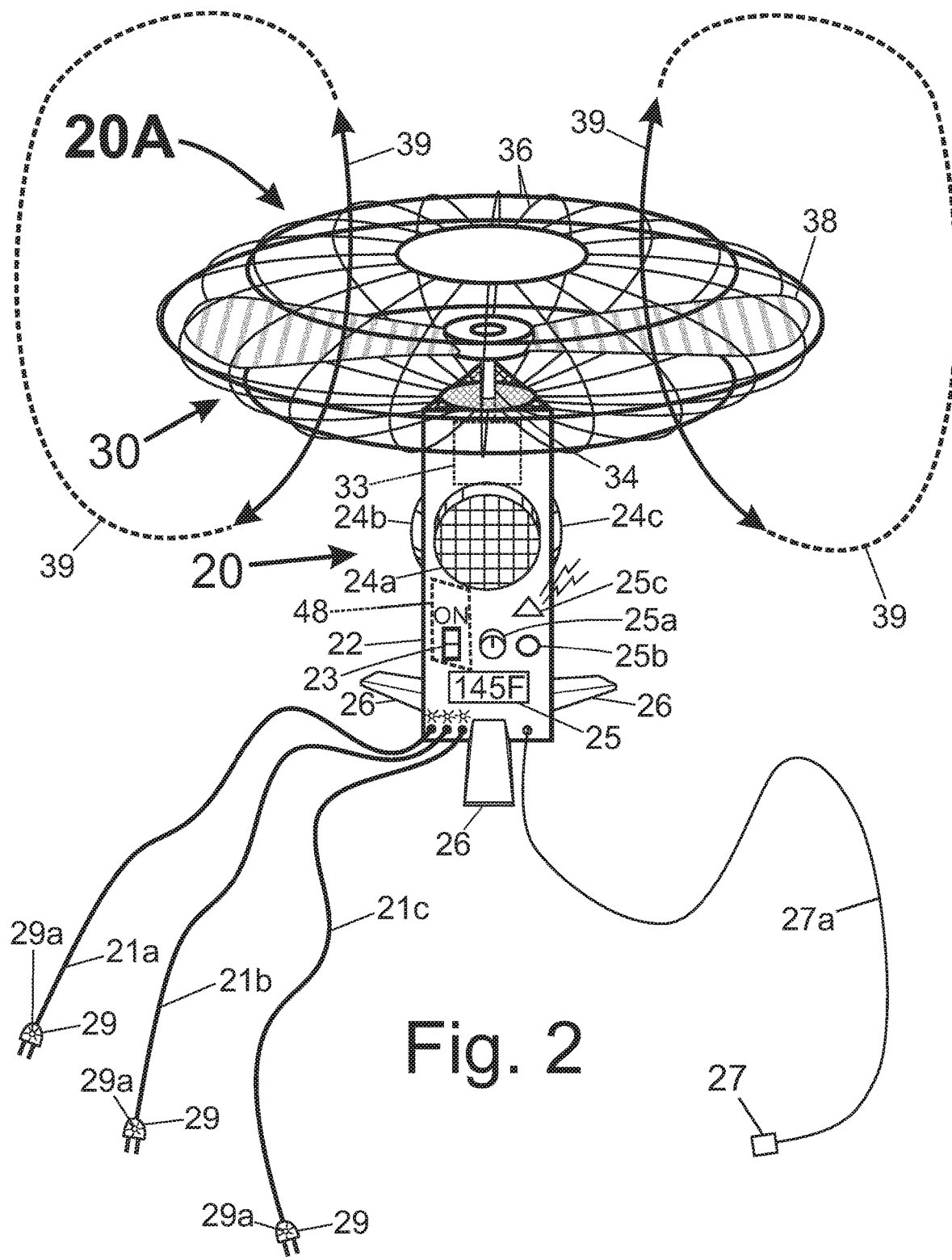
FIG. 2 is a schematic illustration of the second example pest eradication system 20A.

Control of electrical power from the electrical cords 21a-c to the heating units 24a-c may be communicably coupled (either wired or wirelessly) by the programmable module 48, which is configured to regulate operation of the pest eradication systems 20 and 20A (see FIGS. 1 and 2). In some embodiments, for example, the eradication system 20 may include a wireless transmitter/receiver 25c powered by the electrical power in electrical cords 21a, 21b and/or 21c, and configured to wirelessly communicate with the programmable module 48. In such embodiments, suitable wireless protocols that may be employed include, but are not limited to, radio frequency (RF) transmission, Wi-Fi, Bluetooth®, ZigBee®, near field communication (NFC), infrared, or any combination thereof. In other embodiments, however, the eradication system 20 may communicate with the programmable module 48 via wired means, such as by plugging the programmable module 48 into a local network or directly into the programmable module 48 itself. The reader should understand that such wired and wireless communication to the programmable module 48 can be used with all the other disclosed examples presented in the present application. For many embodiments, the programmable module 48 can be built into the pest eradication system itself (i.e., the pest eradication systems 20, 20A, 50 and 60). In other embodiments, the programmable module 48 might be connected by wire to the system so that it can remain outside the room being heat treated.

The programmable module 48 may be programmed to selectively operate the eradication system 20 to reach a thermal death point for pest and their eggs. As used herein, the phrase "thermal death point" refers to the temperature and time constraints necessary to kill a particular pest and their eggs if they have any. The thermal death point for bedbugs and their eggs, for example, may require a temperature that meets or exceeds 118° F. and maintains the temperature at or above that temperature for at least 20 minutes.

In operation, the pest eradication system 20 may be positioned near the center of the room being treated. While the exact position of the eradication system 20 is not critical, it should be placed as far away from walls and other flammable objects as possible. Placement near the center of the room facilitates the formation of a toroidal airflow within the room, that is, air moving out from the heating units 24a-c can flow along the floor, then through natural convection flow up the walls and across the ceiling back to the center of the room and then flow back down into the air intake at the top of the eradication system 20. Once properly positioned, operation of the eradication system 20 may be triggered through communication with the programmable module 48 or a combination of the power switch 23 (hereafter "switch 23"), control dial 25a and/or selection button 25b to enter temperature and time settings into the programmable module 48. The display 25 can act as a user interface for the user and allow them to easily enter needed information.

In other embodiments, the programmable module 48 may be programmed to autonomously operate the eradication system 20 on a predetermined schedule or as needed. In such embodiments, for example, the programmable module 48 may be programmed to operate the eradication system 20 once a week, or once a month, or on a particular date, without departing from the scope of the disclosure.

Apart from the operational characteristics of killing bedbugs, mold, ticks, bacteria, dust mites, scabies, cockroaches, body lice, fleas and other pests, the eradication system 20, as well as the other disclosed pest eradication systems, may also operate as a general use high-power space heater as controlled by a user. Accordingly, the eradication system 20 may be designed to maintain a comfortable room temperature to reduce heating costs by keeping other rooms of a home or office cooler during cold weather.

In some embodiments, computer hardware may be used to implement the various illustrative circuits, modules, elements, components, methods, and algorithms described herein. This computer hardware can include a processor configured to execute one or more sequences of instructions, programming stances, or code stored on a non-transitory, computer-readable medium. The processor can be, for example, a general-purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In some embodiments, computer hardware can further include elements such as, for example, a memory (e.g., random access memory (RAM), flash memory, read only memory (ROM), programmable read only memory (PROM), erasable read only memory (EPROM)), registers, hard disks, removable disks, CD-ROMS, DVDs, or any other like suitable storage device or medium.

Executable sequences described herein can be implemented with one or more sequences of code contained in a memory. In some embodiments, such code can be read into the memory from another machine-readable medium. Execution of the sequences of instructions contained in the memory can cause a processor to perform the process steps described herein. One or more processors in a multi-processing arrangement can also be employed to execute instruction sequences in the memory. In addition, hard-wired circuitry can be used in place of or in combination with software instructions to implement various embodiments described herein. Thus, the present embodiments are not limited to any specific combination of hardware and/or software. The processor and its implementation of executable sequences can be incorporated in each of the pest eradication systems disclose herein.

As used herein, a machine-readable medium will refer to any medium that directly or indirectly provides instructions to a processor for execution. A machine-readable medium can take on many forms including, for example, non-volatile media, volatile media, and transmission media. Non-volatile media can include, for example, optical and magnetic disks. Volatile media can include, for example, dynamic memory. Transmission media can include, for example, coaxial cables, wire, fiber optics, and wires that form a bus. Common forms of machine-readable media can include, for example, thumb drives, floppy disks, flexible disks, hard disks, magnetic tapes, other like magnetic media, CD-ROMs, DVDs, other like optical media, punch cards, paper tapes and like physical media with patterned holes, RAM, ROM, PROM, EPROM, and flash EPROM.

FIG. 2 is a schematic illustration of the second example pest eradication system 20A (hereafter "eradication system 20A"), according to one or more embodiments of the present disclosure. The eradication system 20A can be made compact and lightweight so that a single user can easily transport the eradication system 20A by themselves. As illustrated, the eradication system 20A comprises the eradication system 20 and an air circulation fan assembly 30. The eradication system 20A can also comprise the programmable module 48, as seen in FIG. 1, for turning on and off power to the heating units 24a-c in a preprogrammed or other controlled manner. As illustrated, the air circulation fan assembly 30 (hereafter "circulation fan assembly 30") can comprise an axial type of fan assembly and can be mount on top of the eradication system 20 and comprise an electric fan motor 33, a drive shaft 34, a fan guard 36 and a set of axial fan blades 38 (hereafter "axial fan blades 38") can comprising multiple fan blades. The eradication system 20 can be of the same construction as seen in FIG. 1. The electric fan motor 33 (hereafter "fan motor 33") can be mounted in the top of the housing 22 with the drive shaft 34 extending upward and connecting to the axial fan blades 38. As illustrated, the fan motor 33 can turn the axial fan blades 38 at high speed in either direction to produce an airflow path either upward or downward as desired. The physical arrangement of the axial fan blades 38 with respect to the floor of the room is designed to produce a torus-shaped air circulation pattern 39 within the room being treated. This toroidal circulation pattern can very efficiently bring heat to every part of the room being treated. The eradication system 20, as well as other pest eradication systems disclosed herein, can create the substantially torus-shaped air circulation pattern 39 (hereafter "toroidal airflow 39") within rooms containing various types of furniture or furnishing susceptible to the infestation and maintenance of bedbugs, mold, ticks, bacteria, dust mites, scabies, cockroaches, body lice, fleas, and/or other pests. The toroidal airflow 39 is illustrated smaller than actual size. The dashed line sections of the toroidal airflow 39 would, in real life, substantially extend out to the ceiling and walls of the room during operation. In the illustrated embodiments, for example, the room being treated might contain a bed and, more particularly, a mattress or bed assembly which may comprise a headboard and a footboard (not shown) which are common for bedroom furniture. To improve airflow, the various furniture and furnishings within the room can be moved slightly away from the walls. The toroidal airflow 39 can flow under and around these furnishings to provide heat to all portions of the room using the single circulation fan assembly 30. The circulation fan assembly 30 can move a large volume of air within a room being heat treated by the eradication system 20A in the desired toroidal airflow 39 pattern. Each of the two directions for the toroidal airflow 39 has its own advantages. For pest extermination, the airflow in the downward direction can be desirable for forcing heated air radially outward along the floor. The eradication system 20A can be designed to expel a flow of hot air along the floor and then against the walls of the room being treated by directing the toroidal airflow 39 downward within the circulation fan assembly 30. Natural convection helps the hot air to rise along the walls then hitting the ceiling and moving radially inward along the ceiling and then downward and back into the top of the circulation fan assembly 30. This creates a donut-shaped air circulation pattern (i.e., toroid-shaped) within the room being treated to provide good heat transfer without auxiliary fans being needed. In this way, freshly heated air from heating units 24a-c can deposit its heat energy near the floor where surfaces are more difficult to heat because of natural convection. Additionally, for many rooms being treated, this downward and outward flow of hot air across the floor can force the hot air into the cracks that are sometimes present at the interface between the floor and the walls. In some embodiments, the toroidal airflow 39 can be directed upward instead of downward with the circulation fan assembly 30 to make use of natural convection with the heated air spreading out along the ceiling and then down the walls as it cools and back to the eradication system 20A to be reheated again. In both airflow directions, the positioning of the eradication system 20A near the center of the room facilitates the toroid-shaped airflow within the room. The placement of the circulation fan assembly 30 above the floor on the eradication system 20A uses the floor surface to direct the airflow radially across the floor and thus set up the toroid-shaped airflow within the room. The vertical airflow created by the circulation fan assembly 30 combined with the open radial structure of the eradication system 20A provides a three-hundred-sixty degree radial air movement at the floor to create the toroidal airflow 39 within the room being treated.

The eradication system 20A can have a heat output that can reach the desired operational temperatures within the room being treated within about two to eight hours. In other embodiments the eradication system 20A can have additional electrical cords (see electrical cords 21a-c) that connect to additional heating units (see heating units 24a-c). The additional electrical cords and heating units can provide more heat for heating a room faster or allowing the heating of larger rooms to a particular operating temperature.

The eradication system 20A may be capable of generating a thermal gradient within a specific room sufficient to exterminate not only bedbugs and their residual bedbug larva and eggs, but also mold, ticks, bacteria, dust mites, scabies, cockroaches, body lice, fleas, and nearly any other insect residing within the room being treated. To accomplish this, in at least one embodiment, a foam strip can be placed under entrance doors to the room to reduce influx of cool outside air into the room being treated, this can reduce heat loss. In some embodiments, a vent cover might be used in the room being treated to block off central air system vents and their return vents. In other embodiments, heat from the house heating system can be used to increase the temperature in the room being treated. Home central heating systems can rise the air temperature of air circulating within the hose by about 60° F. This means that heat from the central heating system can provide 160° F. air to the room being treated if the temperature in the hose is 100° F. and thus still heat to the room even if the room being treated is already at 150° F. The home heating system can provide heat directly to the room, and provide higher temperatures in rooms surrounding the room being treated, reducing heat loss to these other rooms and thus increasing the ease at which high temperatures can be achieved to kill insects, bacteria and mold pests in the treated room.

Figure 3:
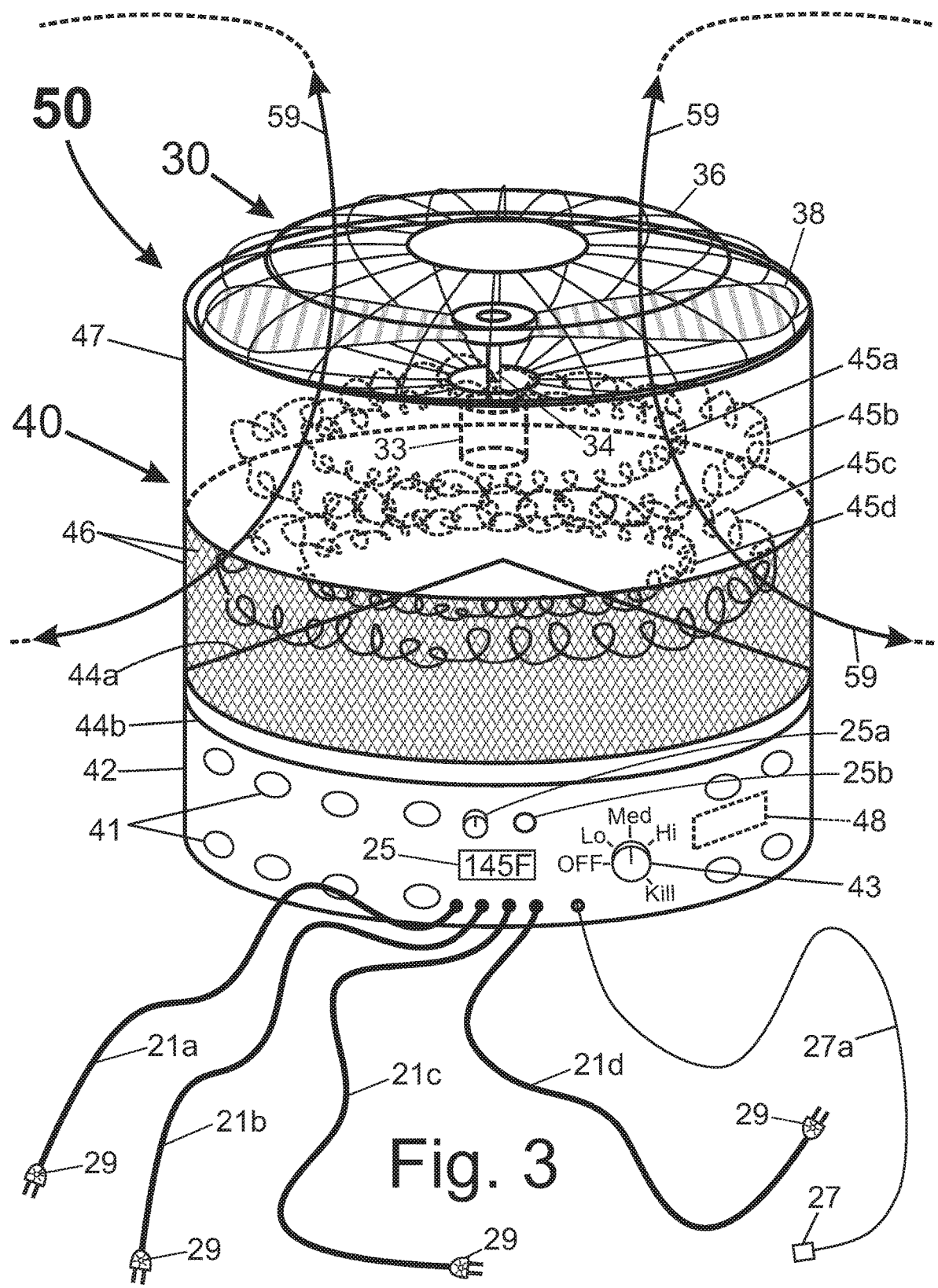
FIG. 3 is a schematic illustration of the third example pest eradication system 50 using an axial circulation fan.

FIG. 3 is a schematic illustration of the third example pest eradication system 50 (hereafter "eradication system 50"), according to one or more embodiments of the present disclosure. The eradication system 50 can be made compact and lightweight so that a single user can easily transport the eradication system 50 by themselves. As illustrated, the eradication system 50 may comprise the circulation fan assembly 30 and a multiple plug heater 40. As illustrated, the circulation fan assembly 30 is an axial fan design and can be the same as shown in FIG. 2 and comprise the fan motor 33, the drive shaft 34, the fan guard 36 and the axial fan blades 38. In alternate embodiments the circulation fan assembly 30 can comprise various type of high-airflow fan designs (e.g., an axial flow fan, a centrifugal fan, a squirrel cage fan, a blade-less venturi fan (Dyson), etc.) which can provide a large volume of air movement. In alternate embodiments, the circulation fan assembly 30 can be placed in other locations within the eradication system 50. Similarly, in alternate embodiments, the multiple plug heater 40 and its heating elements can be reshaped to provide various ergonomic advantages. For example, as illustrated in FIG. 5, a centrally positioned centrifugal fan can blow air radially outward in all directions with a minimum of supporting guide surfaces to provide a toroidal air circulation pattern 59 (full toroidal path not shown, see toroidal airflow 39) and heat distribution within the room being treated. The toroidal air circulation pattern 59 illustrate how air can be forced through the multiple plug heater 40 and out the sides of the eradication system 50 and into the surrounding room while also keeping the air circulation at high speed within the room. This outward direction of airflow helps force the heated air into the lower corners and edges of the room being treated. In some embodiments, the toroidal air circulation pattern 59 can be reversible (i.e., reverse the direction of rotation of the fan motor 33) so the user can select which direction they want the air to flow within the room being treated by the eradication system 50.

As illustrated in FIG. 3, the multiple plug heater 40 may comprise four electrical cords 21a-d (electrical cords 21a-c seen previously), the display 25, the control dial 25a, the selection button 25b, an external temperature sensor 27 (hereafter "temperature sensor 27"), multiple vent holes 41 in a lower housing 42, a mode control selector 43, a shaped heat shield 44a, a secondary heat shield 44b, a set of four heating elements 45a-d (hereafter "heating elements 45a-d), a safety screen 46, an upper housing 47 and the programmable module 48 previously discussed. In alternate embodiments the wireless transmitter/receiver 25c can also be incorporated into the eradication system 50 to control its operation. The lower housing 42, the heat shields 44a and 44b, the safety screen 46 and the upper housing 47 can provide the structural support for the eradication system 50 and can be welded or otherwise attached to each other to form an out case and support structure for the other components. In some embodiments, the lower housing 42, the heat shields 44a and 44b, the safety screen 46 and the upper housing 47 can be constructed of a metal alloy to provide resistance to high temperatures, however, with circulation fan assembly 30 providing a sufficiently large airflow, one or more plastics can be used for these structural support components. The multiple vent holes 41 in the lower housing 42 can help prevent heat buildup under the eradication system 50 and the heat shields 44a-b can also help reduce heat buildup under the eradication system 50. Shaped heat shield 44a can also be shaped to facilitate the heated air to follow the toroidal airflow 39 shown. The electrical cords 21a-d, display 25, control dial 25a, selection button 25b, temperature sensor 27, mode control selector 43 and programmable module 48 can all be mounted to the lower housing 42, while the fan motor 33 and fan guard 36 can be mounted to the upper housing 47. The shaped heat shield 44a and secondary heat shield 44b can be constructed as part of the lower housing 42, the safety screen 46 or be a separate piece that connects the lower housing 42 to the safety screen 46. In other embodiments, the lower housing 42, heat shields 44a-b, safety screen 46 and upper housing 47 can be assembled in many different ways. The shaped heat shield 44a and secondary heat shield 44b can have an air space between them to act as an insulation, or other thermal insulation materials can be placed between these two heat shields. The heating elements 45a-d, electric fan motor 33 and fan guard 36 can be mounted to the upper housing 47 which is held in place by the safety screen 46 and optionally additional structural supports (not shown).

The display 25 can comprise a heat resistant display technology, such as an LED panel, that can tolerate 150° F. or higher temperatures. The display 25 can be designed to present various user information, such as, but not limited to, the current room temperature from the temperature sensor 27, the mode of operation for the fan and/or heating elements (Lo, Med and Hi Heat for comfort and "Kill" mode for high-temperature pest killing operation) using the mode control selector 43, a countdown timer until shutoff and other data. The user display can also be used to display information while the user is entering preferences, such as, but not limited to, the operating temperature desired (selected with control dial 25a and/or selection button 25b), an operation time period which the eradication system 50 will operate before turning off (selected with control dial 25a and/or selection button 25b), the fan speed (selected with mode control selector 43) and other control information.

The control dial 25a can comprise a prior art potentiometer 52 and selection button 25b can comprise a simple normally open electrical button switch or a toggle switch. Both control dial 25a and selection button 25b can be mounted to the sides of the lower housing 42. the control dial 25a and selection button 25b can be used to program the programmable module 48 with the desired operational temperatures, operating time, maximum temperatures, to display previous temperature data measured by the temperature sensor 27 and other criteria that might be needed to properly heat a particular room to rid it of pests (insects, mold and/or bacteria). Mode control selector 43 can be a multiple position switch that provides the desired electrical signals to the programmable controller 48, fan motor 33 and/or heating elements 45a-d to operate the eradication system 50 in a desired manner to kill various pests in a particular manner. Mode control selector 43 can directly control the operation of the fan motor 33. An additional on/off switch (not shown on the eradication system 50, see switch 23 in FIGS. 1 and 2) can be incorporated into the eradication system 50 as a master power switch, but the programmable module 48 and mode control selector 43 can also provide this power switch function.

The safety screen 46 can comprise a heavy weight wire mesh to protect the user from the heating elements 45a-d and provide support for the upper housing 47. In alternate embodiments, the safety screen 46 can have two or more layers and can be constructed of plastic, metal and/or composites. The safety screen 46 should have a relatively open mesh design so that air can easily flow through it.

The upper housing 47 can have electrically insulating mounts (not shown for clarity of the drawing) for supporting the heating elements 45a-d. In alternate embodiments, the heating elements 45a-d which are illustrated as comprising a coil of resistance wire can each be replaced with the ceramic heating elements (see FIG. 5B) or other type of prior art heating elements. Ceramic heaters tend to produce lower temperatures than resistance wire for the same power and are relatively inexpensive to make and install. The lower temperatures of ceramic heaters mean that they can be mounted in plastic housings to further reduce costs.

As illustrated in FIG. 3, circulation fan assembly 30 can be mounted on top of upper housing 47 so that air can be forced down through the heating elements 45a-d and out radially through the safety screen 46. Each of the heating element 45a-d can draw power from one electrical cord 21a-d respectively. Each electrical cord plug into a different separate electrical wall outlet which are each on different circuit-breaker circuits to safely provide about 6,000 watts of heat (1,500 watts per wall outlet) to a single room in most American and European homes. Because most American homes have both fifteen amp and twenty amp circuits, their wall outlets can have different capacities depending on the wiring within the home. However, household appliances use 1,300 watts or less to avoid tripping circuit breakers in their customer's home. For this reason, the eradication system 50 can use twelve amp heating elements exclusively so that users does not have to know how to select between fifteen amp and twenty amp circuits for higher power heating element. This will save much frustration for many users.

However, for commercial users with trained workers, the eradication system 50 may include both fifteen amp and twenty amp heating elements (minus any safety factor) or have all twenty amp heating elements. The trained worker can then connect the higher power twenty amp heating elements with their associated electrical cord that is marked "20 amp" to the higher power twenty amp wall outlets in a home or building. In such embodiments, the associated electrical cords 21a-d can be clearly marked as to the amperage of heating element connected to that particular power cord. The trained worker simply makes sure twenty amp power cords are connected to twenty amp circuits within the house or building. The lower power heating elements using only fifteen amps can be plugged into either fifteen amp or twenty amp circuits within the home or building. Using four-20 amp circuits, and connecting the electrical cords 21a-d to twenty amp wall outlets can allow the heating elements 45a-d to each provide over 2,000 watts of power (17 amps at 120 volts) for a total of more than 8,000 watts. For many homes and buildings have more than four separate wall plug circuits and thus, the eradication system 50 can be expanded with additional electrical cords and heating elements if desired. Many large homes have six or more twenty amp wall outlet circuits which could allow the eradication system 50 to obtain over 10,000 watts of power (less any safety margin designed in to the eradication system 50) with the addition of a fifth-20 amp heating element and fifth electrical cord (see FIG. 5A).

Figure 4:
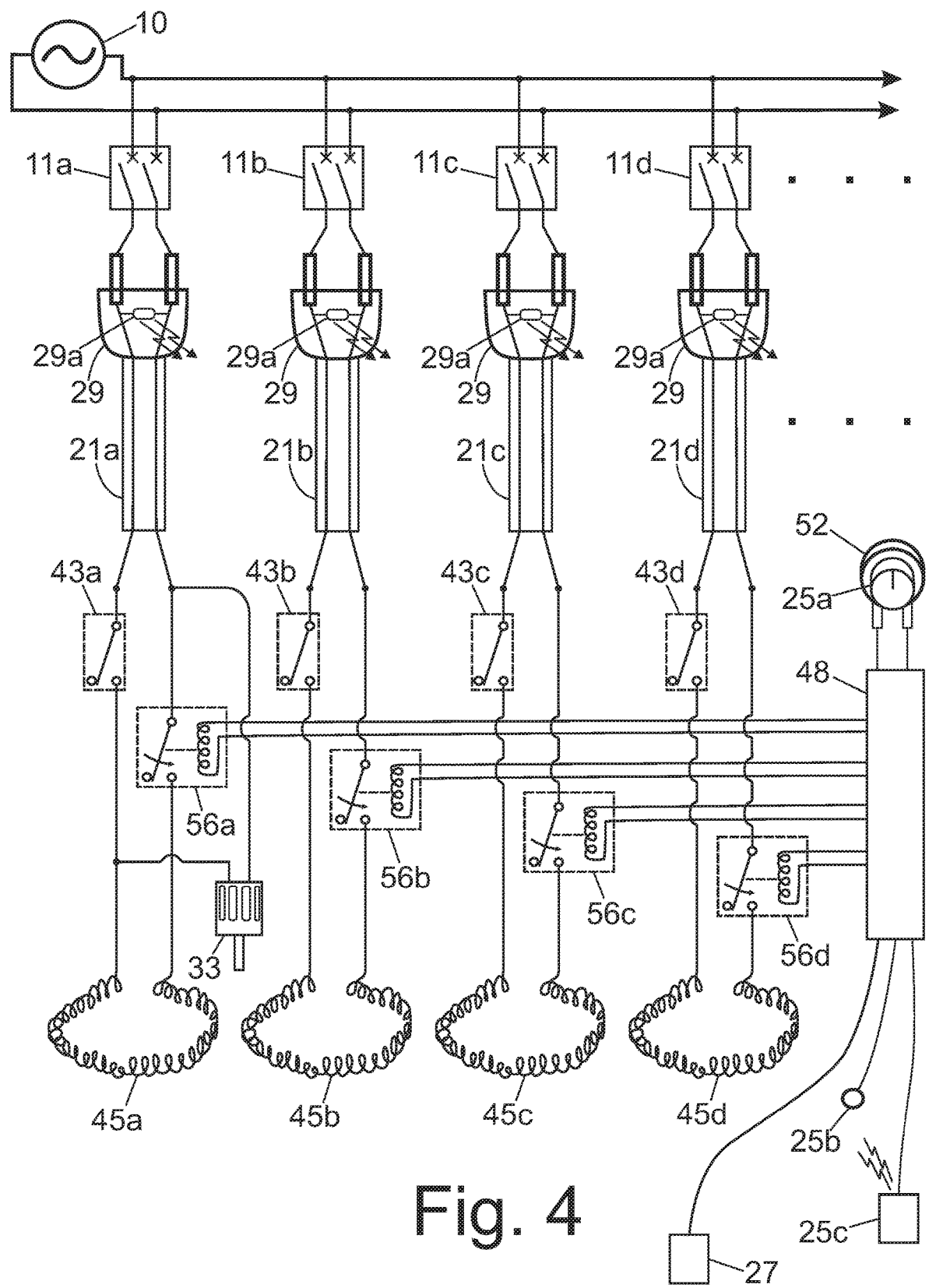
FIG. 4 is an electrical schematic of the example electrical wiring for the third example pest eradication system seen in FIG. 3.

FIG. 4 is a circuit diagram of one possible arrangement for a home electrical system connected to the pest eradication system 50 seen in FIG. 3. The electrical power source 10 (hereafter "power source 10", see FIG. 1) can supply a home with AC current and can provide this current to multiple circuit breakers (first four circuit breakers 11a through 11d shown). The electrical power flowing through the circuit breakers 11a-d can go to different wall outlets to provide electrical power to the eradication system 50 through the electrical cords 21a-d respectively. Note houses and buildings can be wired in many different ways and the circuit diagram shown in FIG. 4 is one of many possible examples. For example, most houses have multiple wall outlets on the same circuit breaker and draw current through the same circuit breaker. Thus, the electrical cords 21a-d can potentially be plugged into different wall outlets, but still have two or more of the electrical cords drawing power through the same circuit breaker. If more than one of the electrical cords 21a-d is plugged into the same circuit breaker the high power rating of the individual heating elements 45a-d can draw too much current and the circuit breaker will disconnect (trip) and cut power to that circuit. To eliminate this problem each of the electric cords 21a-d must be plugged into a wall outlet that is on a separate circuit breaker from the other electrical cords.

as illustrated in FIG. 4, four electrical switches 43a-d are used to turn on and off power to the internal circuitry of the eradication system 50 and can be incorporated into mode control selector 43. Where electrical switches 43a-d are all closed when mode control selector 43 is turned to "Kill". In alternate embodiments additional prior art circuitry (not shown) can be added to provide lower temperature electric heating for comfort where possibly only one or two heating elements are involved in providing the heat. The programmable module 48 is shown connected to four relay switches 56a-d (i.e., additional relay switches if more heating circuits are used) which can control the electrical power that reaches the heating elements 45a-d, respectively. The relay switches 56a-d can comprise mechanical relays, solid state relays, or some other type of electronic control that will allow the programmable module 48 to turn-off and turn-on power to the heating elements 45a-d. Control dial 25a is shown physically connected to the prior art potentiometer 52 and electrically connected to the programmable module 48 to allow analog inputs to be entered into the programmable module 48 and for selecting such information as maximum operating temperature, treatment duration and other settings that might be used to control the operation of the eradication system 50. When electrical switches 43a-d and relay switches 56a-d (electrically controlled switches) are closed, electrical power can flow from the power source 10 to the heating elements 45a-d, respectively. The selection button 25b is optional and can be used for selecting the operational mode for the eradication system 50. For example, the selection button 25b can be pressed to change the way the eradication system 50 determines its course of action. For example, one setting might simply operate at full power until a specific amount of time has elapsed, a second setting might start timing of the room treatment after the selected temperature is reached, a third setting might be to select the direction of the fan motor 33 operation, a fourth setting might be to select if the fan continues to operate after power to the heating elements 45a-d is stopped, and etc.

As illustrated in FIG. 4, the temperature sensor 27 on the end of sensor wire 27a can be connected to the programmable module 48, such that, the programmable module 48 can use information sent from the temperature sensor 27 to perform specific action as selected by the user. The wireless transmitter/receiver 25c can be connected to the programmable module 48 so that the programmable module 48 can be programed remotely and/or user settings entered via a computer. In some treatment sessions, the desired temperature may never be reached, thus the programmable module 48 or other device should keep a record of the temperatures achieved during the treatment session so that the user can review the data later. The temperature information can alternatively be exported to an external computer via the wireless transmitter/receiver 25c. In some embodiments, the wireless transmitter/receiver 25c can be a wired connection such as ethernet, USB, etc. or include both wired and wireless communication capability. Note that FIG. 4 shows a simple circuit for driving the fan motor 33. In the designs disclosed here, the fan motors 33 can be electrically connected to always operate while power is going to the heating elements 45a-d. Thus, the fan motor 33 may turn "ON" when the mode control selector 43 is turned to Lo, Med, Hi or Kill and especially when electrical switches 43a-d are closed. Making sure the circulation fan assembly 30 is operating when power is turned "ON" can ensure that the eradication system 50 and other pest eradication systems disclosed herein do not overheat. Note that in FIG. 4, the fan motor 33 will be operating whenever the electrical switch 43a is closed. In other words, power does not need to be flowing to the heating elements 45a-d for the fan motor 33 to operate.

Figure 5A:
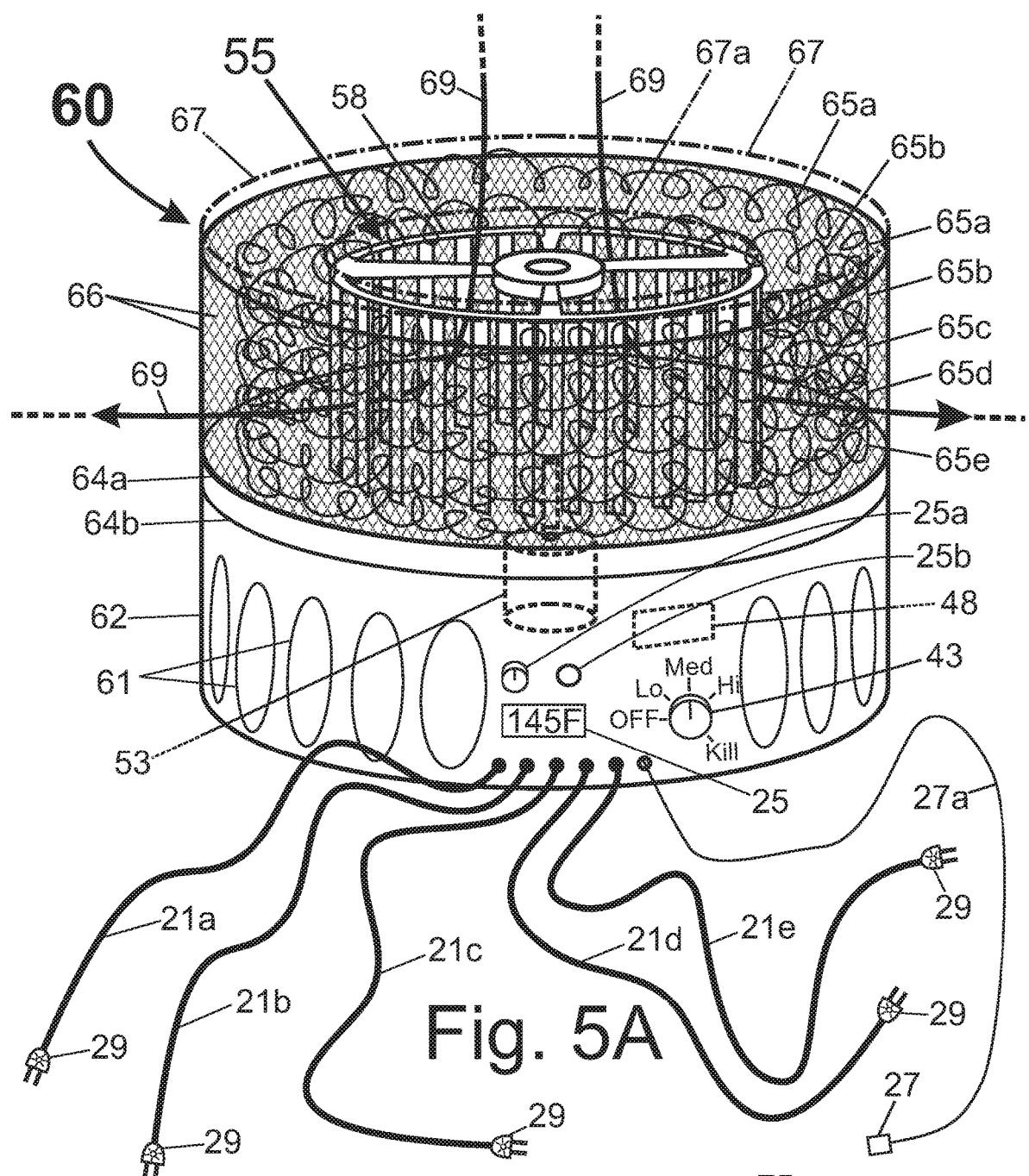
FIG. 5A is a schematic illustration of the fourth example pest eradication system 60 using a centrifugal circulation fan.

FIG. 5A is a schematic illustration of the pest eradication system 60, according to one or more embodiments of the present disclosure. The pest eradication system 60 (hereafter "eradication system 60") can be made compact and lightweight so that a single user can easily transport the eradication system 60 by themselves. As illustrated, the eradication system 60 can comprise a centrifugal fan assembly 55, five electrical cords 21a, 21b, 21c, 21d and 21e each with its own electrical plug 29, a lower housing 62, two thermal barriers 64a and 64b, five heating elements 65a-e, a safety screen 66, and a upper housing cover 67. The eradication system 60 can further comprise the previously discussed display 25, control dial 25a, selection button 25b, temperature sensor 27 on the end of sensor wire 27a, mode control selector 43 and programmable module 48. Each electrical cord 21a-e must be plugged into a different electrical wall outlet (similar to wall outlet 12), each on a different circuit breaker (e.g., circuit breaker 11a, 11b, 11c, 11d, etc.), so that each electrical cord 21a-e can draw nearly the maximum amount of power from its respective electrical wall outlet without tripping its associated circuit breaker. The eradication system 60 may be increased in power output and otherwise configured to heat larger sized rooms by adding additional electrical cords (similar to electrical cords 21a-e) and additional heating elements (similar to the heating elements 45a-d, 65a-e and 70). In alternate embodiments, higher-voltage electrical cords (e.g., 220-volt circuits) and heating elements can be used to increase the overall power output of the eradication system 60. The eradication system 60 may be used to treat rooms containing various types of furniture and/or furnishing susceptible to the infestation and maintenance of bedbugs, mold, ticks, bacteria, dust mites, scabies, cockroaches, body lice, fleas, and/or other pests. The room being treated may also contain a closet and multiple articles of clothing, a dresser, an upholstered furniture and other furnishings such as, but not limited to, a sofa, a loveseat, a futon, a recliner, chair, or any combination thereof that can safely be heated to a predetermined operating temperature. Accordingly, while FIG. 5A depicts only the eradication system 60 itself, the room in which the eradication system 60 would be placed may contain multiple items to be cleared of pests during a single room treatment. The disclosure of specific items within the treated room is merely for illustrative purposes and should not be considered limiting to the scope of treatable items for the present disclosure.

In FIG. 5A, the centrifugal fan assembly 55 (often called a squirrel cage fan) can comprise a fan wheel 58 that is attached to a fan motor 53 at its drive shaft. The fan motor 53 and attached fan wheel 58 can be mounted to the lower housing 62. In this example, the rotational axis of the fan wheel 58 is oriented vertically, with air being pulled in from the top during operation and pushed out radially from all sides of the eradication system 60. A radial airflow is thus generated by the centrifugal fan assembly 55 that spreads out across the floor of a room being treated. The fan wheel 58 naturally creates this radial airflow without additional structures because of its orientation and lack of airflow diverting surfaces. In fact, the illustrated configuration of the centrifugal fan assembly 55 eliminates many of the airflow structures normally found on other prior art centrifugal fan assemblies, which saves cost. The advantage of orienting the fan wheel 58 in this way is that air naturally flows radially outward in every direction away from the eradication system 60 with little or no structure to control the flow of air from the fan wheel 58. This saves on construction cost by eliminating many components and simplifying the design. This radial airflow, combined with an air intake opening 67a that is positioned at the top of the eradication system 60, can produce a toroidal airflow 69 within the room being treated. The radial airflow of heated air can spread out in all directions across the floor of the room being treated. This radial airflow (see toroidal airflow 69) that is exiting the eradication system 60 will eventually reach the walls of the room being treated and turn upward. With help from natural convective forces (i.e., buoyant forces) and the momentum of the moving air, the radial airflow will turn and flow up the walls of the room. The ceiling of the room then forces the airflow to turn back inward across the ceiling toward the center of the room where the airflow will meet itself near the center of the room and turn downward to flow back into the air intake opening 67a of the centrifugal fan assembly 55 (i.e., the solid line portion of the toroidal airflow 69). This toroidal circulation of the air (toroidal airflow 69) is only partially shown with the dashed line portion of toroidal airflow 69 extending off the page (see toroidal airflow 39 in FIG. 2). Thus, toroidal airflow 69 defines a central axis that passes through the centrifugal fan assembly 55 to create a substantially torus-shaped airflow that can be maintain even with substantial amounts of furniture and other items within the room. The general toroid-shape for the toroidal airflow 69 can be maintained as the heated air goes around and under various pieces of furniture in its path. Placement of the eradication system 60 near the center of the room being treated can facilitates a well-formed toroidal airflow 69.

The lower housing 62 can comprise a plurality of oversized air holes 61, the thermal barrier 64a and/or the thermal barrier 64b. In some embodiments, the lower housing 62 can support the fan motor 53 and fan wheel 58, the display 25, the control dial 25a, the selection button 25b, the sensor wire 27a, the mode control selector 43, the programmable module 48, the two thermal barriers 64a and 64b, the five heating elements 65a-e, and the safety screen 66. The upper housing cover 67 (shown in outline only) can be similar to the fan guard 36 and attached to the top portion of the safety screen 66 completing the exterior housing. In some embodiments, the upper housing cover 67 can provide bearings at its center to help hold the top portion of the fan wheel 58 in place during operation. The centrifugal fan assembly 55 can be sized to fit within the inside diameter of the heating elements 65a-e. A structural support for the heating elements 65a-e is not shown to keep the drawing as uncluttered as possible but could comprise a support structure that is part of the safety screen 66. In some embodiments, this support structure for the heating elements 65a-e can also function as a protective cover for the fan wheel 58. In other embodiments, this protective cover (not shown) can surround the fan wheel 58 to ensure the heating elements 65a-e do not come in contact with the fan wheel 58.

The prior art in the areas of centrifugal fans and electric space heaters is extensive and the example shown here in FIG. 5A is just one of many different arrangements that an engineer could use. The heating elements 65a-d can be similar to the heating elements 45a-d (seen in FIG. 3) are illustrated as coiled resistor wire heating elements, but this is only one example of the many types of heating elements that might be used. This example was used because it was one of the easiest to draw and was easily recognizable by the reader and did not block the view of the user from seeing other components (e.g., fan wheel 58). However, the use of resistive wire heating elements have their problems and a much better choice for the heating elements 45a-d and 65a-e would be ceramic type heating elements that use a radiator like design with ceramic sections that heat the radiator fins (see FIG. 5B). The ceramic type heating elements also operate at much lower temperature than the resistor wire heating elements 45a-d and 65a-e made of resistor wire and thus allows for a safer pest eradication system (i.e., eradication systems 20, 20A, 50 and 60). As illustrated in FIG. 5A, the centrifugal fan assembly 55 can produce a significant airflow over the heating elements 65a-e to keep them relatively cool and also to move heated air out into the room and into areas where air normally stagnates, such as the corners of the room and behind furniture. The fast circulation of air around the room improves the even distribution of heat so that there are not any areas of the room that are significantly hotter or cooler than other areas.

In FIG. 5A, the electrical cords 21a, 21b, 21c, 21d and 21e, the display 25, the control dial 25a, the selection button 25b, the extended temperature sensor 27, the mode control selector 43, the programmable module 48, and the five heating elements 65a-e can all be constructed as similarly functioning items previously seen in FIGS. 1 through 4. The five electrical cords 21a-e can be connected to wall outlets on five different circuit breaker circuits to provide over 7,500 watts of power to the eradication system 60. In European countries four electrical cords might provide similar amounts of power because of the 220 volt-10 amp circuits normally used there. The lower housing 62 can include the oversized air holes 61 to allow air to enter under the thermal barriers 64a and 64b. As illustrated, the centrifugal fan assembly 55 can pull air from above through an air intake opening 67a. The air intake opening 67a might be covered with a protective screen that still allows air to enter. As illustrated, the oversized air holes 61 allow cooling air to move through the underside of the thermal barriers 64a-b. In some embodiments, the centrifugal fan assembly 55 may also pull a smaller portion of its suction air in through the thermal barriers 64a and 64b and oversized air holes 61. To provide this smaller portion of suction air, one or more holes or passageways (not shown) can be made through the thermal barriers 64a-b to allow air in. This can allow air to flow up into the center of the fan wheel 58 from below and mix with air flowing downward through the air intake opening 67a (see toroidal airflow 69). This helps cool the fan motor 53 and also prevent overheating under the eradication system 60 by providing a continuous supply of fresh outside air. Notice that the fan motor 53 can easily replace the fan motor 33 in the circuit diagram in FIG. 4 and provide the electrical circuit for the eradication system 60.

Figure 5B:
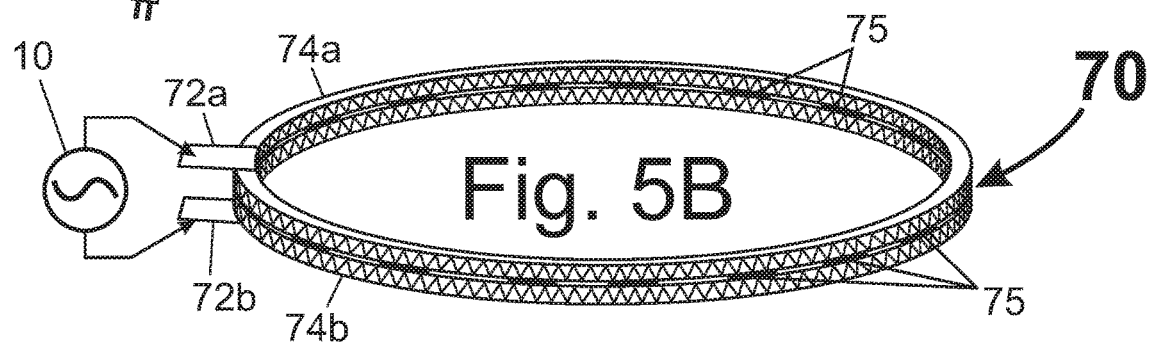
FIG. 5B is a schematic illustration of a ring-shaped ceramic heater that could be used in the pest eradication systems seen in FIGS. 3 and 5A.

FIG. 5B is a schematic illustration of the ring-shaped ceramic heating element 70 that can be substituted for heating elements 45a-d seen in FIG. 3 and heating elements 65a-e seen in FIG. 5A. As illustrated in FIG. 5B, the ceramic heating element 70 can comprise two electrical contacts 72a-b, a top corrugated metal ring 74a, a bottom corrugated metal ring 74b, and multiple ceramic patches 75 between the top and bottom corrugated metal rings 74a and 74b, respectively. The top corrugated metal ring 74a and bottom corrugated metal ring 74b (collectively "corrugated metal rings 74a-b") can act as both a conductor of electrical current and a radiator for heat. Current from the electrical contacts 72a and 72b are designed to flow through the corrugated metal rings 74a-b. The multiple ceramic patches 75 are bonded physically and electrically to the corrugated metal rings 74a-b. The multiple ceramic patches 75 are electrically conductive and complete the electrical circuit between the electrical contacts 72a and 72b. The electrical resistance of the multiple ceramic patches 75 is considerably greater than the resistance of the corrugated metal rings 74a-b so that ohmic heating occurs mostly in the multiple ceramic patches 75. When the power source 10 is applied to electrical contacts 72a-b, electric current flows between the corrugated metal rings 74a-b and through the multiple ceramic patches 75 to generate heat that is conducted into the corrugated metal rings 74a-b. As illustrated in FIG. 5B, the ceramic heating element 70 can be sized relative to the eradication system 60 in FIG. 5A so that it can replace the heating elements 65a-e and fit inside the safety screen 66 and surround the fan wheel 58. In alternate embodiments, the ceramic heating element 70 can be constructed in different shapes to take advantage of a particular design for a particular pest eradication system. For example, disk shaped ceramic heating elements might be used with the eradicating system 50, which can have their radiator fins oriented vertically to allow easy vertical airflow from the circulation fan assembly 30. In alternate designs, four ceramic heating element 70 might replace the heating elements 45a-d but be positioned lower on the eradication system 50 and in front of the safety screen 46 so that the airflow is not unduly restricted. In other embodiments, ceramic heating elements can have a standard rectangular box shape and can be positioned around the interior of the eradication systems 20, 20A, 50 and 60 to provide heat.

Apart from the operational characteristics of killing bedbugs, mold, ticks, bacteria, dust mites, scabies, cockroaches, body lice, fleas, and other pests, the eradication systems 20, 20A, 50 and 60 may also provide soothing warmth in cold weather. The eradication systems 20, 20A, 50 and 60 can also contain prior art space heater electronics to control one or more of their heating units or heating elements in these eradication systems to provide and maintain a specific lower temperature in a room for user's comfort. The prior art is full of ways for controlling the heat output of space heater elements, such as, the heating elements 45a-d and 65a-e and also heating systems similar to the heating units 24a-c. thus, for very little added cost, each of the disclosed pest eradication systems can also act as a super powerful space heater to provide warmth for relatively large rooms or areas in a home or building.

OPERATIONAL DESCRIPTION

The operation of the pest eradication systems 20, 20A, 50 and 60 are substantially similar and can comprise five steps: 1) first plugging each of the electrical cords into its own wall outlet where each wall outlet is on a different circuit-breaker circuits, 2) placing the pest eradication system near the center of the room to be treated and away from other objects, 3) selecting the time and/or temperature for the treatment, 4) sealing the room being treated (i.e., closing doors) and 5) turn-on the house central heat for a short period of time to provide faster heating of the room and to reduce heat loss through interior walls (i.e., smaller temperature differential between adjacent rooms).

For step 1), to plug each electrical cord into a wall outlet that is on a different circuit-breaker circuit, the user can always use a trial-and-error method and simply plug each electrical cord in one at a time and turn on the pest eradication system and checking if a circuit breaker trips. If a circuit breaker trips because of over amperage, the user can unplug the last electrical cord plugged in and try a different wall outlet until they find a different circuit-breaker circuit that does not trip a circuit breaker. This might not be as difficult as it sounds since for a particular room, such as, each bathroom and the kitchen, their wall outlets are usually on their own circuit breaker. The kitchen often has two circuit breaker outlets to allow multiple toaster, frier, and other kitchen tools to operate at the same time. In some homes the wall outlets on the kitchen island will be on a separate circuit breaker from the rest of the wall outlets in the kitchen. Thus, just having two bathrooms and a kitchen might get you to four different circuit-breaker circuits and you haven't even started trying wall outlets in the bedrooms, living room, den, dining room, garage, etc.

If the user does NOT want to use the trial-and-error method of finding separate circuits, one can go to the circuit-breaker box and see if the circuit breakers are labeled. In some cases, there is enough information to track down likely wall outlets that are on separate circuit breakers. A more industrious person might test each circuit breaker and then label all the wall outlets on that circuit breaker using different stickers or carefully writing the circuit breaker number for each wall outlet. After the user is finished labeling their wall outlets, then they can easily plug in the multiple electrical cords by simply plugging each electrical cord into a uniquely numbered wall outlet.

For step 2), the user can simply place the pest eradication system in an open area near the center of the room being treated for pests. The temperature of heated air coming from pest eradication systems 20, 20A, 50 and 60 can be considerably cooler than standard space heaters at room temperature because of the higher speed airflow their fan assemblies produce. If for some reason the pest eradication system must be placed near a wall because of clutter (it is better to clean up clutter before treatment), an uneven toroidal airflow can still be created within the room if the pest eradication system is placed at least a few feet from the walls. As the room temperature increases, the temperature of the heated air produced by the pest eradication systems will also increase because the air temperature rises as the air passes through the pest eradication systems remaining nearly constant. If the circulation fan provides a large volume of air movement, the air temperature rises as it passes through the pest eradication system can have a relatively small, which means the air temperature exiting the pest eradication systems can be relatively low (i.e., far from flammable temperatures). Thus, pest eradication systems can be placed relatively close to furniture and flammable items without fear of temperatures reaching their ignition point. For example, if the pest eradication system produced 200-degree Fahrenheit air when the room temperature was 150° F., you can't catch an item on fire with a blast of 200 degree Fahrenheit air no matter how close the pest eradication system is to the flammable object. In fact, if the flammable object did somehow get hotter than 200° F., the convection of 200° F. heated air would tend to cool the flammable object back down to 200° F. However, the placement of the pest eradications system near the center of the room helps create a smoothly circulating toroidal airflow within the room. Placement of the pest eradication system near a wall simply shifts the center axis of toroidal airflow to where the pest eradication system is placed. The safety comes from the fast-moving air convect heat quickly away from the pest eradication system and quickly mixing the heated air with cooler room air. In some embodiments, a safety sensor that detects the speed of the airflow within the pest eradication systems can be used to turn off the system (i.e., eradication systems 20A, 50 and 60) if that airflow drops below a minimum safe speed.

For step 3) the user can use the various dials and input devices provided on the pest eradication systems to program the programmable module 48. In general, the user will select a treatment time and a treatment temperature based on the pests that need eradicating and to a lesser extent the objects in the room. In some embodiments, the user can simply select the temperature they want to treat at and the programmable module 48 would heat the room to that temperature and maintain that temperature for a predetermined time (i.e., one hour). If the objects in the room are insulated like boxes, dressers, mattresses, etc., then longer treatment times after reaching the selected temperature could be selected by the user to ensure high temperatures reach the inner most parts of those items. For example, for mattress and box springs without blankets or comforter a total treatment time of around eight hours can be used to ensure temperatures above 130° F. are achieved between the mattress and box spring. For dressers full of clothing, it may take twenty-four hours for the heat to penetrate to the center of the stacks of clothing in the drawers and kill any pests there. Thus, this programing step is critical to ensure the full eradication of the pests being targeted by the treatment.

For step 4), the user can seal the room by closing doorways and optionally sealing the bottom of the entry doors to the room being treated. While sealing this crack at the bottom of the doors will not significantly affect the general temperature in the room being treated, cool air does tend to flow into the room under the door. Thus, the floor area, just inside the door, may experience considerably cooler temperatures than the rest of the room because of the cool air entering under the door. For this reason, it is recommended that something (e.g., foam strip, cloth material, paper, etc.) be stuffed in the crack under the doors to the room to prevent this cool spot near the doors.

For step 5), the user can turn on their house heat (central heat, etc.) to as high as it will go. This will not only increase the speed of the temperature rising within the room being treated but will also increase the maximum temperatures that are possible for the room. As the temperature in the treated room rises, so does the amount of heat "leaking" from the room (i.e., cool air entering the room from gaps in the walls, conduction of heat through the walls, floor, ceiling and windows, etc.). Thus, for a particular room and a particular power output of the pest eradication system, there will be a maximum temperature rise possible between the room being treated and the rest of the house or building. This temperature rise is also dependent on the treatment time, because as time of treatment increases the rooms around the room being treated will rise in temperature creating an apparently warmer house or building.

The operation of pest eradication systems 20 and 20A can be substantially the same. First, the electrical cords 21a-c would be plugged into three separate wall outlets that are on separate circuit-breaker circuits and the temperature sensor 27 might be placed in a location within the room being treated that is specific to the user's needs. For example, if the user wants to have a particular temperature reached in a particular area of the room, the user can place the temperature sensor 27 in that location of importance (e.g., between the mattress and box spring for treating the mattress, in the corner of the room to ensure killing pests near the walls, etc.). In alternative embodiments, more than one temperature sensor 27 can be used with the disclosed pest eradication systems so that temperatures at different locations around the room being treated can be sensed and recorded. The use of multiple temperature sensors 27 can allow for a more accurate measurement of the temperatures in the room for the pest eradication systems disclosed herein. In other embodiments, multiple temperature sensors, similar to temperature sensor 27, can be used to measure temperature both internal temperatures within the disclosed pest eradication systems and also externally temperatures within the room being treated. Each of these multiple temperature sensors can be connected to the programmable module 48 for controlling the eradications systems 20, 20A, 50 and 60 and achieving a thermal death point for specific pests.

After everything is plugged in and the temperature sensor (s) 27 is(are) in place, the user can flip switch 23 to the "ON" position which can connect the power source 10 to the air circulation fans and also connect power to the heating units 24a-c. Having the fans running whenever any of the pest eradication system is operating is a safety feature. Once power is on the user can use the display 25 in combination with control dial 25a and selection button 25b to enter the treatment procedure, treatment time and/or target temperature. The treatment procedure might consist of simply selecting a treatment time or could comprise a more complicated treatment, such as, heating the room to a specific temperature and then maintaining that specific temperature for a selected amount of time. In alternate embodiments many other treatment options and preferences could be selected. After the treatment procedure, treatment time, and/or target temperature are selected by the user, the programmable module 48 can automatically start the pest eradication systems 20 and 20A and perform the selected operations (e.g., turn on all heating units to full power). When the procedure is completed, the programmable module 48 can turn-off the pest eradication system and cut power to the heating units 24a-c and any internal circulation fans that may be within the heating units 24a-b and the axial fan blades 38. In some embodiments, any internal circulation fans that may be within the heating units 24a-b and/or the axial fan blades 38 can remain running for a predetermined period of time to help cool down the pest eradication system and also provide continued forced convection heating within the room being treated. In alternative embodiments, temperature data from one or more temperature sensors 27 can be recorded and saved by the programmable module 48. Then, after the pest eradication system is finished, the user can check to see if sufficient high temperatures were maintained for a sufficiently long period of time in the treated room to effectively kill the pests being eradicated. In this way, the user can confirm that the pests have been effectively eradicated. In other embodiments, the user may only select the type of pest or pests they are trying to kill and the programmable module 48 can use temperature data from the one or more temperature sensors 27 to generate the needed time and temperature (i.e., the thermal death point) to kill the selected pest or pests.

As illustrated in each of the example pest eradication systems 20, 20A, 50 and 60, the electrical power supplied to the heating units 24a-c and/or heating elements 45a-d, 65a-e and/or 70 can be activated through either the programmable module 48 and/or the wireless transmitter/receiver 25c. Control systems within the programmable module 48 can activate relay switches to connect electrical power from the power source 10 to the heating units 24a-c and/or heating elements 45a-c, 65a-e, and/or 70. The programmable module 48 comprise a program that alerts the wireless transmitter/receiver 25c when the desired thermal death point is reached. After the desired "thermal death point" has been reached, the programmable module 48 and/or wireless transmitter/receiver 25c can turn off the pest eradication system. In alternate embodiments the programmable module 48 and/or wireless transmitter/receiver 25c can maintain the temperature for a predetermined time after the thermal death point has been reached. In other embodiments the programmable module 48 and/or wireless transmitter/receiver 25c can be set to operate for a predetermined period of time and temperature consistent with ensuring the eradication of the pests within the room being heat treated. After the predetermined period of time is reached, the programmable module 48 and/or wireless transmitter/receiver 25c can turn off power to the heating units 24a-c and/or heating elements 45a-c, 65a-e, and/or 70 and the room being heat treated is allowed to cool down.

The operation of pest eradication systems 50 and 60 can be substantially the same, with the electrical heating elements 45a-d and 65a-e, respectively being electrically connected to four and five separate wall outlets respectively, which are on separate circuit-breaker circuits. Less heating elements (i.e., electrical cords plugged in) can be used for smaller rooms. The temperature sensor 27 can be placed in a location within the room being treated that is specific to the user's needs. After the electrical cords are plugged in and the temperature sensor 27 is placed, the user can turn mode control selector 43 to the desire function. In some embodiments, when mode control selector 43 is turned to any setting other than "OFF" the circulation fan assemblies 30 and 55 are turned "on" in the eradication systems 50 and 60 respectively, and can provide power to the display 25, control dial 25a, selector button 25b, temperature sensor 27 and fan motor 33 or 53. When the mode control selector 43 is turned to "Lo", "Med" or "Hi" the fan assembly can be turned on and operate at a low, medium or high speed setting and one or more of the heating elements can be activated to provide warming heat for the use. In some embodiments, when in the mode control selector 43 is on "Lo", "Med" and "Hi" all the heating elements of a particular pest eradication systems can be turn on to warm a room for comfort and simply cycle on and off to maintain a specific comfort temperature (e.g., 75° F.). The fan motors 33 and 53 within the eradication systems 50 and 60 respectively, can be always powered on while the eradication system is active as a safety feature. With mode control selector 43 set on "Kill" the circulation fan assemblies 30 and 55 within the eradication systems 50 and 60 respective, can be turned on full power (Highest airflow setting) and the user can use the display 25 in combination with control dial 25a and selection button 25b to enter the treatment procedure, treatment time and/or target temperature. The treatment procedure might consist of simply selecting a treatment time or could comprise a more complicated treatment such as heating the room to a specific temperature and then treating the room after reaching that specific temperature for a selected amount of time. In alternate embodiments many other treatment combinations and values could be selected. During treatment, the heating elements 45a-d, 65a-e and/or 70 can be operated at full power until turned off or may be throttled down after reaching the desired "operating temperature" to maintain that temperature. After the user selects the treatment procedure, treatment time, and target temperature, the programmable module 48 can automatically start the pest eradication systems 50 and 60 and perform the selected operations. When the treatment procedure is completed, the programmable module 48 can turn-off the eradication system 50 and 60 and cut power to the heating elements 45a-d and 65a-e respectively, while allowing the axial fan blades 38 in the eradication system 50 and the centrifugal wheel fan 58 in the eradication system 60 can remain running for a predetermined time period (optional).

The operation of the circuit diagram seen in FIG. 4 is presented here as an illustration of how one might set up the electrical system for a particular pest eradication system. The circuit diagram in FIG. 4 should be understood to be one example of the nearly endless ways an electrical engineer might wire up the pest eradication systems 20, 20A, 50 and 60. As illustrated, FIG. 4 shows one possible circuit diagram for the eradication system 50. Note that a electrical power connection between the power source 10 and the programmable module 48 is not shown in FIG. 4, but such power can be supplied to the programmable module 48 with batteries or other power transformer connected to the power source 10. The use of a transformer or other power supply circuitry for powering the programmable module 48 is common knowledge in industry. In other embodiments, the programmable module 48 can have a built-in power supply so that it can accept AC electrical power directly from the power source 10. The power source 10 can comprise a local electrical utility supplier and circuit breakers 11a through 11d can be integrated in a circuit breaker box with a house or building and provide electrical power to the electrical cords 21a-d and more. Additional circuits beyond the four circuit breakers 11a-d can be added and have similar switching and heating elements as those shown. Inside the eradication systems 50 and 60, the electrical switches 43a-d (and any additional circuits) can be incorporated into mode control selector 43 to provide power to the fan motors 33 and 53 in the eradication systems 50 and 60 respectively. In alternate designs, the power for fan motors 33 and 53 can come from two or more circuit-breaker circuits to reduce the total wattage on any one particular circuit breaker (e.g., circuit breaker 11a as illustrated). Alternatively, the heating element 45a might have a slightly lower wattage rating than the heating elements 45b-d and following, so that the added load of the fan motor 33 (and similarly if fan motor 53 is used) on the circuit breaker 11a allows similar amperage for each circuit breaker 11a-d and following. Thus, as illustrated, the fan motor 33 can be activated as soon as mode control selector 43 is turned away from its "OFF" position and electrical switches 43a-d are closed. After the programmable module 48 has been programmed it can provide an electrical signal to the electrically controlled relay switches 56a-d and following to close the switches and provide power to the heating elements 45a-d for the eradication system 50. A similar arrangement can also be used to provide power to the heating elements 65a-e in the eradication system 60. In alternate embodiments, wireless transmitter/receiver 25c can be used to remotely control the programmable module 48 and control the eradication system 50 or 60 from a remote computer location.

The disclosed pest eradication systems can be easily moved from room to room to treat every room in a house or building. This can save considerable money if for example a hotel buys a single pest eradication system and then moves it from room to room as needed. Its small size also makes the disclosed pest eradication systems very portable, allowing a single person to move the pest eradication system in most cases. Further, many types of heating elements and heating units sized for a single electrical wall outlet can be used within the disclosed eradication systems.

As illustrated the combination of the programmable module 48 and temperature sensor 27 can be used to regulate the temperature of the room being treated. However, in alternative embodiments, the programmable module 48 and temperature sensor 27 can be replaced with a mechanical thermostat for setting and maintaining the desired thermal death point temperature and a mechanical timer can be used to operate the eradication system for a predetermined time period to consistently eradicate pests from a room. After such a predetermined period of time is reached, the mechanical timer can be automatically turned off the heating elements to allow the room to cool down before use. In other embodiments, various combinations of alternative control systems, power supplies, heating elements, fan assemblies, switches, relays, temperature sensors, thermostats, timers, programmable modules and other components can be used to produce a functional pest eradication system that allows heating of a room with 3,000 watts of power or more.

Therefore, the disclosed pest eradication systems and methods are well adapted to attain the ends and advantages mentioned as well as those that are inherent therein. The particular embodiments disclosed herein are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the illustrative embodiments disclosed above may be altered, combined, or modified and all such variations are considered within the scope of the present disclosure. The pest eradication systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A portable pest eradication system for heat treating a single room in a house or a building, comprising:
   a first housing and a second housing, wherein the first housing comprises a safety screen that is attached to a thermal barrier, the thermal barrier being positioned between the first housing and the second housing, and wherein a cover is positioned at the perimeter of the safety screen, wherein the second housing comprises a fan motor and one or more air holes;
   a plurality of electrical heating elements defined on the first housing, wherein the plurality of electrical heating elements comprises ceramic heating elements positioned along an inner surface of the safety screen and spaced apart from one another along a height of the first housing;
   a plurality of electrical cords, each cord powering one or more of the plurality of electrical heating elements, wherein each of the plurality of electrical cords is designed to plug into an electrical wall outlet on a separate circuit-breaker circuit within the house or building;
   a vertical axis centrifugal fan connected to the fan motor, wherein the vertical axis centrifugal fan and housings are adapted to create an airflow radially with respect to the portable pest eradication system to form a toroidal airflow within the single room;
   a programmable module communicably coupled to the electrical heating elements and the plurality of electrical cords to regulate operation of the portable pest eradication system;
   one or more temperature sensors connected to the programmable module for determining the temperature at a particular location either within the portable pest eradication system and/or within the single room being treated, and
   wherein the programmable module in combination with the one or more temperature sensors is programmed to selectively operate the portable pest eradication system to reach a thermal death point within the single room for killing bedbugs, bedbug eggs, mold, ticks, bacteria, dust mites, scabies, cockroaches, body lice, fleas, and/or other pests.

2. The portable pest eradication system of claim 1, wherein the plurality of electrical cords comprises at least three or more electrical cords, whereby an electrical power provided to the plurality of heating elements is at least three times that of one electrical cord of the plurality of electrical cords.

3. The portable pest eradication system of claim 1, wherein the plurality of heating elements each comprise a ceramic heating elements placed radially around the portable pest eradication system and in the airflow produced by the vertical axis centrifugal fan.

4. The portable pest eradication system of claim 1, wherein at least one of the plurality of heating elements comprises a plurality of shaped ceramic heating elements placed with their central axis aligned with the vertical rotational axis of the vertical axis centrifugal fan and in the airflow produced by the vertical axis centrifugal fan.

5. The portable pest eradication system of claim 1, wherein the one or more temperature sensors is positioned on an extended wire for user placement within the single room being treated.

6. The portable pest eradication system of claim 1, wherein the one or more temperature sensors is positioned within the first and/or second housing.

7. The portable pest eradication system of claim 1, wherein the programmable module is programmed to maintain comfort heating temperature for dual use as a space heater.

8. The portable pest eradication system of claim 1, wherein the airflow is directed radially outward from the portable pest eradication system along a floor of the single room and vertically downward above the portable pest eradication system to generate a toroid-shaped airflow within the single room during operation.

9. A portable pest eradication system for heat treatment of a single room in a house or a building, comprising:
   a centrifugal fan defining a vertical axis of rotation during operation, wherein an airflow from the centrifugal fan is directed radially outward substantially in all directions from the portable pest eradication system;
   a plurality of heating elements placed in the airflow of the centrifugal fan, wherein the plurality of heating elements comprises ceramic heating elements being positioned along an inner surface of a safety screen and spaced apart from one another along a height of the safety screen, wherein the safety screen is attached to a thermal barrier, wherein the thermal barrier is attached between a first housing and a second housing, the first housing comprising the safety screen and a cover positioned at the perimeter of the safety screen and the second housing comprising a fan motor wherein the first housing and the second housing are designed to support the plurality of heating elements and the centrifugal fan;

a plurality of electrical cords, each cord being electrically connected to one or more of the plurality of heating elements, wherein each of the plurality of electrical cords is designed to plug into an electrical wall outlet on a separate circuit-breaker circuit within the house or building;

one or more thermostats communicably coupled to the plurality of heating elements and plurality of electrical cords for maintaining a selectable operating temperature;

a timer communicably coupled to the plurality of heating elements for allowing the selection of an operational period of time, and wherein the thermostat and timer are adjustable to selectively operate the portable pest eradication system to reach a thermal death point within the single room being heat treated for bedbugs, bedbug eggs, mold, ticks, bacteria, dust mites, scabies, cockroaches, body lice, fleas, and/or other pests.

10. The portable pest eradication system of claim 9, further including a second temperature sensor on an extended wire for user placement within the single room being treated.

11. The portable pest eradication system of claim 9, wherein at least one of the plurality of heating elements comprises a ring-shaped ceramic style heating element.

12. The portable pest eradication system of claim 9, wherein the thermal death point comprises a temperature that:

meets or exceeds 118° F. and is maintained for at least 90 minutes, meets or exceeds 120° F. and is maintained for at least 1 minute, meets or exceeds 120° F. and is maintained for at least 10 minutes, meets or exceeds 120° F. and is maintained for at least 29 minutes, meets or exceeds 120° F. and is maintained for at least 60 minutes, meets or exceeds 122° F. and is maintained for at least 20 minutes, meets or exceeds 131° F. and is maintained for at least 15 minutes, meets or exceeds 140° F. and is maintained for at least 15 minutes, and/or meets or exceeds 140° F. and is maintained for at least 30 minutes.

13. The portable pest eradication system of claim 9, wherein airflow from the centrifugal fan is directed radially outward along a floor of the single room, wherein the airflow intake is directed downward into the centrifugal fan, wherein a toroidal shaped airflow is created within the single room during operation.

14. The portable pest eradication system of claim 9, wherein the plurality of electrical cords comprises at least three electrical cords each electrically connected to a separate heating element in the plurality of heating elements.

15. The portable pest eradication system of claim 9, wherein the one or more thermostats and timer comprise a programmable controller with a temperature sensor.

16. The portable pest eradication system of claim 1, wherein the vertical axis centrifugal fan comprises the fan motor and a fan wheel, wherein the fan motor is placed behind e the thermal barrier that protects the fan motor from heat generated by the plurality of heating elements, whereby the fan motor is provided with a longer life because of its cooler operating environment.

17. The portable pest eradication system of claim 9, wherein the centrifugal fan comprises the fan motor and a fan wheel, wherein the fan motor is placed behind the thermal barrier that protects the fan motor from heat generated by the plurality of heating elements, whereby the fan motor is provided with a longer life because of its cooler operating environment.

* * * * *